(12) United States Patent
Tanaka et al.

(10) Patent No.: US 6,324,317 B1
(45) Date of Patent: Nov. 27, 2001

(54) WAVELENGTH DIVISION MULTIPLEXING OPTICAL TRANSMISSION SYSTEM

(75) Inventors: Toshiki Tanaka; Takao Naito, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/451,439

(22) Filed: Nov. 30, 1999

(30) Foreign Application Priority Data

Mar. 5, 1999 (JP) .................................................. 11-058499

(51) Int. Cl.⁷ .............................. G02B 6/02; G02B 6/18
(52) U.S. Cl. ............................... 385/24; 385/31; 385/38; 385/27; 359/159
(58) Field of Search ....................... 385/24, 31, 27, 385/38, 50, 122–128; 359/161, 159

(56) References Cited

U.S. PATENT DOCUMENTS 6,188,823 * 2/2001 Ma ....................................... 385/123

OTHER PUBLICATIONS

Neal S. Bergano, et al., "Wavelength Division Multiplexing in Long–Haul Transmission Systems", IEEE Journal of Lightwave Technology, vol. 14, No. 6, pp. 1299–1308, 1996.
M. Murakami,et al., "Quarter terabit (25 x 10 Gb/s) over 9288km WDM transmission experiment using nonlinear supported RZ pulse in higher order fiber dispersion managed line", ECOC '98. 79–81, 1998.
K. Yonenaga, et al., "Dispersion–compensation–free 40–Gbit/s x 4–channel WDM transmission Experiment Using Zero–Dispersion–Flattened transmission Line", OFC '98, PD20, 1998.
T. Kashiwada, et al., "Ultra–low chromatic and polarization mode dispersion hybrid fiber links for ultra–high speed transmission systems", OECC '98, 15C1–3, pp. 364–365, 1998.
M. Onishi, et al., "Optimization of dispersion–compensating fibers considering self–phase modulation suppression", OFC '96, ThA2, pp. 200–201, 1996.
K. Mukasa, et al., "Novel network fiber to manage dispersion at 1.55$\mu$m with combination of 1.3$\mu$m zero dispersion single mode fiber", ECOC '97, pp. 127–130, 1997.
H. Taga, et al., "Performance Evaluation of the Different Types of Fiber–Chromatic–Dispersion Equalization for IM–DD Ultralong–Distance Optical Communication Systems with Er–Doped Fiber Amplifiers", IEEE Journal of Lightwave Technology, vol. 12, No. 9, Sep. 1994.

(List continued on next page.)

Primary Examiner—Phan T. H. Palmer
(74) Attorney, Agent, or Firm—Staas & Halsey LLP

(57) ABSTRACT

An object of the present invention is to provide a WDM optical transmission system with an excellent transmission characteristic by employing a hybrid transmission line which is formed by combining under optimal conditions an optical fiber having positive wavelength dispersion, and an optical fiber having negative wavelength dispersion. According to the WDM optical transmission system, an optical transmitter station, optical amplifiers, and an optical receiver station are interconnected over an optical fiber transmission line. The optical fiber transmission line has an inter-repeater segment formed with a hybrid transmission line composed of a 1.3 $\mu$m zero-dispersion SMF and an RDF, and an inter-repeater segment formed with a DCF for compensating for cumulative wavelength dispersion generated in the hybrid transmission line. As the conditions for setting the hybrid transmission line, a ratio of the length of the RDF to the length of the inter-repeater segment must be 20% or more and 40% or less. Consequently, an influence due to a nonlinear effect or transmission loss in the hybrid transmission line can be minimized to thereby improve a transmission characteristic.

25 Claims, 15 Drawing Sheets

OTHER PUBLICATIONS

K. Mukasa, et al., "Development of Low Nonlinear Line Type DFCF" C–3–76, at the General Meeting of the Society of Electronic Information Communications for 1997.

M. Suzuki, et al., 170Gb/s Transmission Over 10, 850km Using Large Core Transmission Fiber, PD17, OFC'98, PD.

* cited by examiner

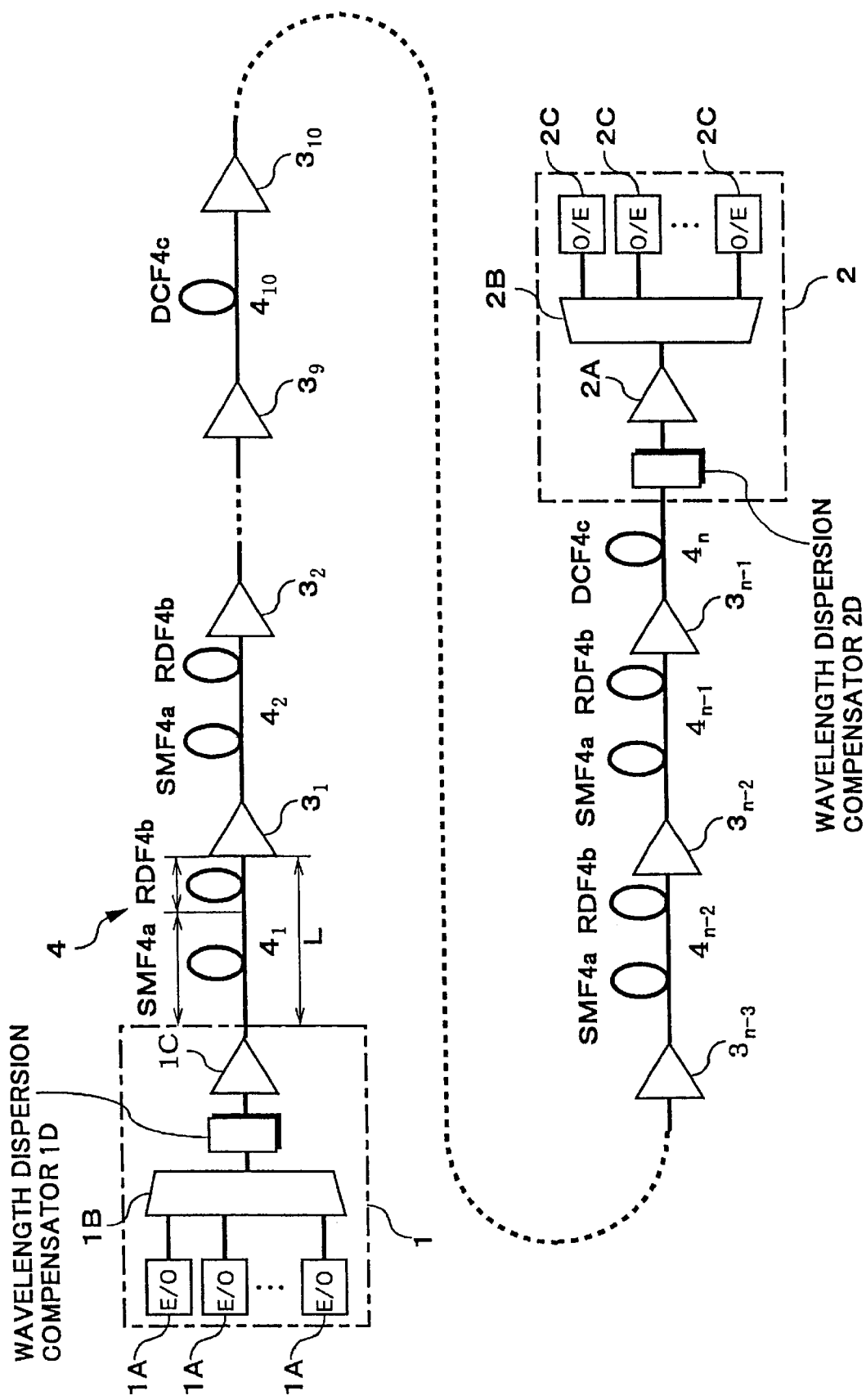

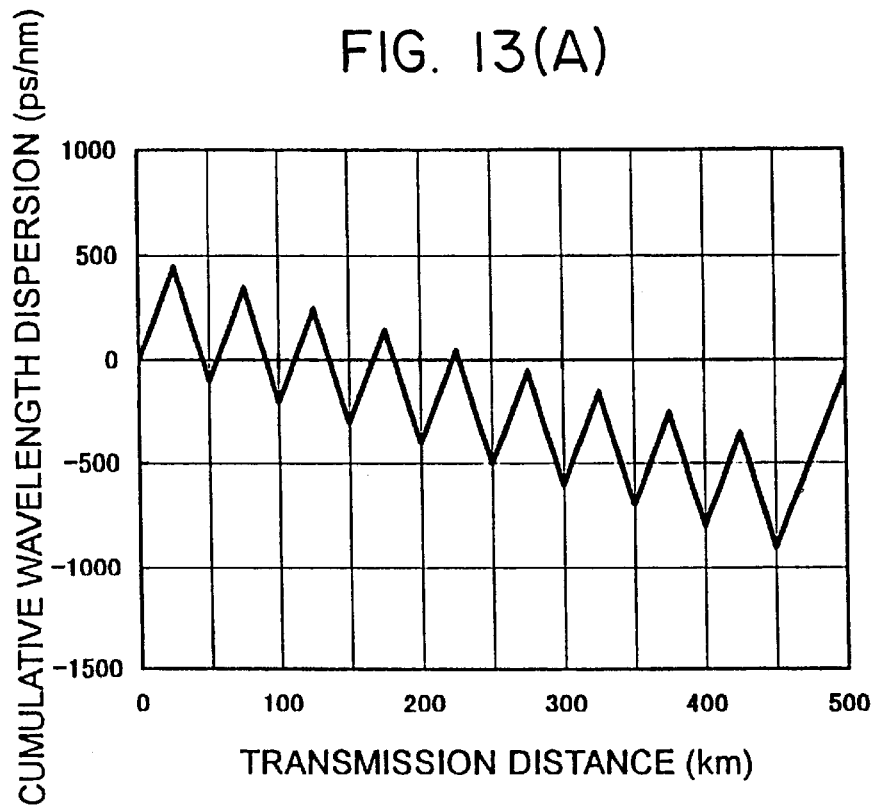
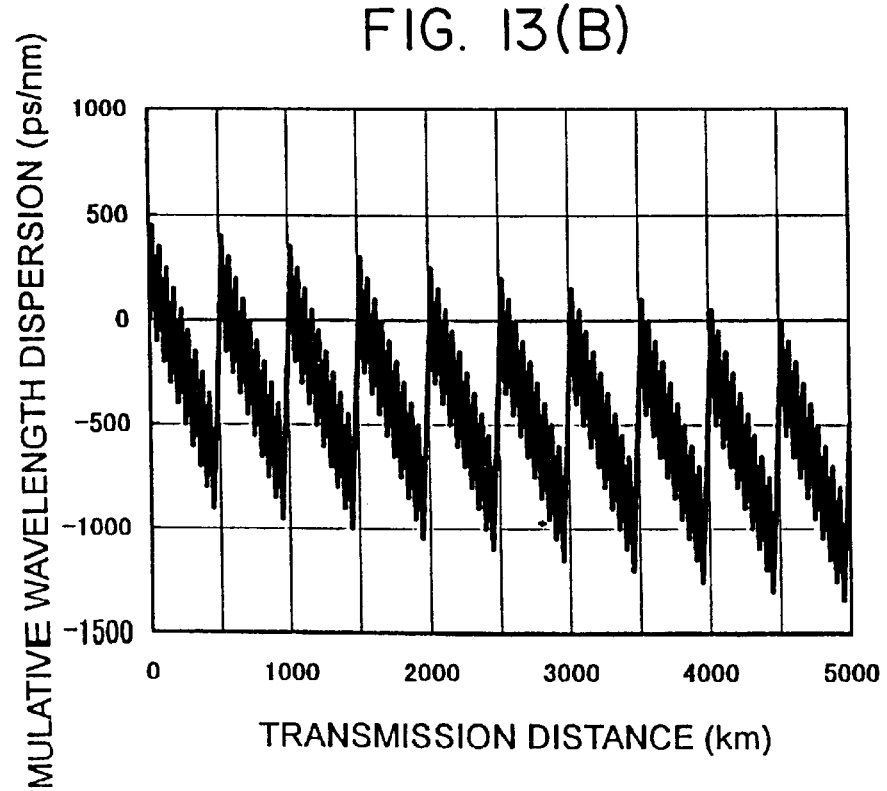

WAVELENGTH DIVISION MULTIPLEXING OPTICAL TRANSMISSION SYSTEM

BACKGROUND OF THE INVENTION

1. Field of the Invention

The present invention relates to a wavelength division multiplexing optical transmission system for carrying out repeating transmission of a wavelength division multiplexed signal light via optical amplifiers. More particularly, this invention relates to a wavelength division multiplexing optical transmission system in which a hybrid transmission line formed by combining optical fibers having reciprocal wavelength dispersion is adopted for compensating for wavelength dispersion and wavelength dispersion-slope.

2. Description of the Related Art

In the past, with long-distance optical transmission systems, optical reproduction repeaters have been used for transmission. The optical reproduction repeaters convert an optical signal into an electrical signal and perform re-timing, reshaping, and regenerating. However, the employment of optical amplifiers has come to be a matter of common practice these days. An optical amplification repeater transmission mode using optical amplifiers as linear repeaters is under discussion. The optical reproduction repeaters are replaced with optical amplifier repeaters, whereby the number of parts included in a repeater can be reduced greatly. Consequently, high reliability can be guaranteed and a great reduction in cost is expected.

Moreover, a wavelength division multiplexing (WDM) optical transmission mode has attracted people's attention as one of modes capable of realizing a large-capacity optical transmission system. According to the wavelength division multiplexing optical transmission mode, two or more optical signals having different wavelengths are multiplexed and transmitted over one transmission line.

With a WDM optical amplification repeater transmission mode which is a combination of the optical amplification repeater transmission mode and WDM optical transmission mode, wavelength division multiplexed signal lights can be amplified collectively using optical amplifiers. Moreover, large-capacity and long-distance transmission can be achieved with a simple (economic) configuration.

Conventional WDM optical amplification repeater transmission systems (hereafter abbreviated to WDM optical transmission systems) adopt a method of managing wavelength dispersion generated in a transmission line so as to minimize deterioration of transmission characteristics due to a nonlinear effect generated in the transmission line.

For example, in an article (1) written by N. S. Bergano et al. and entitled "Wavelength Division Multiplexing in Long-haul Transmission Systems" (IEEE Journal of Lightwave Technology, Vol. 14, No. 6, PP.1299–1308, 1996), a transmission line made by combining a dispersion-shifted fiber (DSF) and a single-mode fiber (SMF) is used as shown in FIG. 16. The dispersion-shifted fiber has a length of approximately 900 km, and is of a zero-dispersion wavelength $\lambda_{OD}$ of 1585 nm, and positive wavelength dispersion-slope. The single-mode fiber has a length of approximately 100 km, and is of a zero-dispersion wavelength $\lambda_{OS}$ of 1310 nm, and positive wavelength dispersion-slope. An average zero-dispersion wavelength $\lambda_{OA}$ of the transmission line is approximately 1558 nm and wavelengths of signal light permitted to be propagated over the transmission line range are from 1556 nm to 1560 nm.

The value of wavelength dispersion generated in the DSF and SMF are approximately −2 ps/nm/km and approximately +20 ps/nm/km respectively The group velocity of signal light and spontaneously emitted light and the group velocity of each signal light are different between the DSF and SMF The employment of the transmission line made by combining the DSF and SMF makes it possible to shorten the time of interaction by a nonlinear effect. Deterioration in transmission characteristics due to four wave mixing (FWM) and cross phase modulation (XPM) can therefore be minimized. Moreover, since the average zero-dispersion wavelength of the transmission line falls within the wavelengths of signal light, deterioration in transmission characteristics due to self phase modulation (SPM) and wavelength dispersion can also be minimized.

However, a bandwidth used for transmission must be expanded in order to increase a capacity of the WDM optical transmission system. In this case, as far as the foregoing configuration is concerned, due to wavelength dispersion-slope, it is hard to compensate wavelength dispersion so that wavelength dispersion will become zero relative to all wavelengths. Consequently, the waveform of signal light is impaired due to interaction between wavelength dispersion that has not been compensated for but cumulated and the nonlinear effect in an optical fiber.

As a countermeasure, a proposal has been made of a transmission line adopting a dispersion compensation fiber as a second half of a transmission segment thereof. The dispersion compensation fiber compensates for wavelength dispersion and wavelength dispersion-slope generated in a first half of the transmission segment of the transmission line. More particularly, for example, a 1.3 μm zero-dispersion SMF having positive wavelength dispersion and positive wavelength dispersion-slope is used as the first half of the transmission segment of the transmission line. A dispersion compensation fiber having negative wavelength dispersion and negative wavelength dispersion-slope slope so as to compensate for the wavelength dispersion and wavelength dispersion-slope generated in the 1.3 μm zero-dispersion fiber is used as the second half of the transmission segment of the transmission line. Thus, the wavelength dispersion-slope is decreased in order to minimize cumulative wavelength dispersion. Eventually, deterioration in transmission characteristics can be alleviated.

According to an article (2) written by M. Murakami et al. and entitled "Quarter terabit (25×10 Gb/s) over 9288 km WDM transmission experiment using nonlinear supported RZ pulse in higher order fiber dispersion managed line" (ECOC'98, PP.79–81, 1998), an average wavelength dispersion-slope may be minimized to 0.0067 ps/nm²/km. Specifically, a 1.3 μm zero-dispersion fiber is used as a first half of a transmission segment of a transmission line, and a dispersion compensation fiber is used as a second half thereof. The 1.3 μm zero-dispersion fiber has a length equivalent to 50% of the transmission segment and positive wavelength dispersion. The dispersion compensation fiber has a length equivalent to 50% of the transmission segment and negative wavelength dispersion.

Moreover, according to an article (3) written by K. Yonenaga et al. and entitled "Dispersion-compensation-free 40-Gbit/s×4-channel WDM transmission experiment using zero-dispersion-flattened transmission line" (OFC'98, PD20, 1998), an average wavelength dispersion-slope may be minimized to −0.0028 ps/nm²/km. Specifically, a 1.3 μm zero-dispersion fiber is used as a first half of a transmission segment of a transmission line, and a dispersion compensation fiber is used as a second half thereof. The 1.3 μm zero-dispersion fiber has a length equivalent to 55% of the transmission segment and positive wavelength dispersion.

The dispersion compensation fiber has a length equivalent to 45% of the transmission segment and negative wavelength dispersion.

Furthermore, according to an article (4) written by T. Kashiwada et al. and entitled "Ultra-low chromatic and polarization mode dispersion hybrid fiber links for ultra-high speed transmission systems" (OECC'98, 15C1-3, PP.364–365, 1998), an average wavelength dispersion-slope may be minimized to 0.008 ps/nm²/km. Specifically, a 1.3 μm zero-dispersion fiber is used as a first half of a transmission segment of a transmission line, and a dispersion compensation fiber is used as a second half thereof. The 1.3 μm zero-dispersion fiber has a length equivalent to 84% of the transmission segment and positive wavelength dispersion. The dispersion compensation fiber has a length equivalent to 16% of the transmission segment and negative wavelength dispersion.

For realizing a WDM optical transmission system which has a larger capacity and enables longer-distance transmission, a transmission line is requested to meet requirements, namely, (a) a transmission loss must be small, (b) a nonlinear effective area must be large, (c) the wavelength of signal light must not agree with a zero-dispersion wavelength of the transmission line, (d) an averaged value of wavelength dispersion measured in a direction of transmission distance must be negative, (e) a compensation interval of cumulative wavelength dispersion must be sufficiently large relative to an inter-repeater space, and (f) wavelength dispersion-slope must be small or be able to be compensated for.

With a conventional WDM optical transmission system employing a transmission line made by combining a 1.3 μm zero-dispersion fiber having positive wavelength dispersion and a dispersion compensation fiber having negative wavelength dispersion, as described above, the nonlinear effective area of the dispersion compensation fiber used as the second half of the transmission line is relatively small, and a transmission loss thereof is relatively large. Consequently, the system is susceptible to a nonlinear effect and an optical signal-to-noise ratio becomes low. Therefore, even when wavelength dispersion and wavelength dispersion-slope are compensated for, a transmission characteristic is not improved satisfactorily.

Now, the magnitude of improvement in a transmission characteristic will be estimated quantitatively, to clarify problems underlying the WDM optical transmission systems described in the above described articles.

A transmission characteristic of a WDM optical transmission system greatly depends on an optical signal-to-noise ratio. When an output of each repeater is higher and a transmission loss is smaller, the optical signal-to-noise ratio has a larger value. The repeater output and transmission loss can therefore be used as indices indicating the magnitude of improvement in the transmission characteristic of the WDM optical transmission system.

The repeater output is limited by a nonlinear effect generated in a transmission line. It is therefore important to quantitatively estimate the occurrence of the nonlinear effect. In general, the nonlinear effect $\phi_{NL}$ can be expressed as formula (1) below.

$$\phi NL = \frac{2 \cdot \pi}{\lambda} \cdot \frac{n2}{A_{eff}} \cdot P \cdot L \quad (1)$$

where λ denotes the wavelength of signal light, $n_2$ denotes a coefficient of a nonlinear refractive index of a transmission line, and $A_{eff}$ denotes a nonlinear effective area of the transmission line. Moreover, P denotes optical power, and L denotes a transmission distance.

A 1.3 μm zero-dispersion single-mode fiber (SMF) having positive wavelength dispersion is used as the first half of the transmission line whose whole length is L. A dispersion compensation fiber (reversed dispersion fiber: RDF) having negative wavelength dispersion and negative wavelength dispersion-slope is used as the second half thereof. Herein, a distance from an incident end to a border between the 1.3 μm zero-dispersion SMF and RDF shall be $l_b$. In this case, the nonlinear effect $\phi_{NL}$ varies depending on the ratio of the length of the RDF to the length of the transmission segment.

The optical power P(l) at a position separated by a distance $l$ (0<$l$<L) from the incident end of the transmission line is expressed as formula (2) below.

$$P(1)=P(0) \cdot e^{-\alpha 1} \quad (2)$$

where α denotes a transmission loss (unit: 1/km).

Consequently, the nonlinear effect $\phi_{NL}$ generated in a hybrid transmission line composed of the 1.3 μm zero-dispersion SMF and RDF can be expressed as formula (3) below based on the formulas (1) and (2).

$$\phi NL = \frac{2 \cdot \pi \cdot P_{(0)}}{\lambda} \int_O^L \frac{n2(1)}{A_{eff}(1)} \cdot e^{-\alpha 1} d1 \quad (3)$$

$$n2(1), Aeff(1) = \begin{cases} n2, SMF, Aeff, SMF (0 \le 1 \le 1b) \\ n2, RDF, Aeff, RDF (1b < 1 \le L) \end{cases}$$

The nonlinear effect $\phi_{NL}$ given by the formula (3) is standardized using, as a reference value, a value of the nonlinear effect when a transmission line is made using only a DSF that is a typical transmission fiber. The nonlinear effective area of the DSF is divided by the standardized nonlinear effect to calculate an average nonlinear effective area in a longitudinal direction of the hybrid transmission line with respect to the nonlinear effective area of the transmission line formed with the DSF alone. Consequently, the magnitude of relaxation in the nonlinear effect is calculated based on the nonlinear effect of the transmission line formed with the DSF alone, that is, the magnitude of relaxation in the upper limit of repeater output, is calculated.

The magnitude of improvement in a transmission characteristic of the hybrid transmission line with respect to the transmission characteristic of the transmission line formed with the DSF alone, resulting from relaxation in the upper limit of repeater outputs is expressed as follows:

10 Log{$A_{eff}$(1 )/$A_{eff}$(2)} (dB)

where $A_{eff}$(1) denotes the average nonlinear effective area in the longitudinal direction of the hybrid transmission line, and $A_{eff}$(2) denotes the nonlinear effective area of the transmission line formed with the DSF alone.

The magnitude of improvement in a transmission characteristic resulting from reduction in a transmission loss is expressed as follows:

{Loss(2)−Loss(1)}×Length of transmission segment (dB)

where Loss(1) denotes a value (expressed in the unit of dB) indicating an average transmission loss in the longitudinal direction of the hybrid transmission line, and Loss(2) denotes a value (in the unit of dB) indicating an average transmission loss in a longitudinal direction of the transmission line formed with the DSF alone.

The magnitude of improvement I in a transmission characteristic of a system using the hybrid transmission line relative to a transmission characteristic of a system using the transmission line formed with the DSF alone can be evaluated quantitatively according to formula (4) below.

$$1=10 \text{ Log}\{A_{\text{eff}}(1)/A_{\text{eff}}(2)\}-\{\text{Loss}(2)-\text{Loss}(1)\} \text{ (dB)}$$

For example, assume that the transmission distance L is 50 km. The formula (4) expressing the magnitude of improvement I is solved using values listed in Table 1 of parameters indicating the characteristics of the 1.3 μm zero-dispersion SMF, RDF, and DSF respectively.

TABLE 1

| Parameters of characteristics | 1.3 μm zero-dispersion SMF | RDF | DSF |
|---|---|---|---|
| Nonlinear effective area $A_{\text{eff}}$ (μm²) | 80 | 20–40 | 50 |
| Coefficient of nonlinear refractive index n(m²/W) | $2.8 \times 10^{-20}$ | $3.6 \times 10^{-20}$ | $3.3 \times 10^{-20}$ |
| Transmission loss Loss (dB/km) | 0.18 | 0.2–0.5 | 0.2 |

The respective parameter values concerning the 1.3 μm zero-dispersion SMF in Table 1 are referred to the above article (4). The respective parameter values concerning the RDF are referred to the above article (2) and an article (5) written by M. Onishi et al. and entitled "Optimization of dispersion-compensating fibers considering self-phase modulation suppression" (OFC'96, ThA2, PP.200–201, 1996). The respective parameter values concerning the DSF are referred to the above article (5). Moreover, in Table 1, the transmission loss is expressed in the unit of dB/km. For solving the formula (3), a value converted to the unit of 1/km is used as α.

FIG. 17 is a graph showing the values of the magnitude of improvement I in a transmission characteristic which are calculated in accordance with the foregoing conditions. The lengths of the SMF and RDF on the axis of abscissas indicate the length of the 1.3 μm zero-dispersion SMF used as the first half of the transmission segment and the length of the RDF used as the second half thereof, respectively. The axis of ordinates indicates the magnitude of improvement I in a transmission characteristic of a hybrid transmission line. The values of the magnitude of improvement I are plotted according to the ratio of the length of the RDF within the transmission segment corresponding to the combination of the respective parameters concerning the RDF (transmission loss Loss and nonlinear effective area $A_{\text{eff}}$).

As shown in FIG. 17, compared with when the transmission line is formed with the DSF alone, a transmission characteristic of the hybrid transmission line tends to be improved as the length of the RDF serving as the second half gets shorter.

As for the WDM optical transmission systems described in the foregoing articles (2) and (3), the magnitude of improvement in a transmission characteristic will be discussed using the foregoing method. However, the articles do not refer to the practical characteristics of a dispersion compensation fiber (RDF) used as the second half of the transmission segment of the transmission line. For the characteristics, an article (6) written by K. Mukasa et al and entitled "Novel network fiber to manage dispersion at 1.55 μm with combination of 1.3 μm zero dispersion single mode fiber" (ECOC'97, PP. 127–130, 1997) was referenced.

In the WDM optical transmission systems described in the articles (2) and (3), the ratio of the length of the RDF, of which nonlinear effective area is relatively small, to the length of the transmission segment is large (about 50%). An average nonlinear effective area within the transmission segment is therefore small. This hinders alleviation of a nonlinear effect.

Specifically, the nonlinear effective area of the 1.3 μm zero-dispersion SMF used as the first half of the transmission line is as large as approximately 80 μm². A transmission loss occurred in the 1.3 μm zero-dispersion SMF is as small as approximately 0.20 dB/km. The diameter of a mode field in the RDF used as the second half of the transmission line is 5.8 μm. In other words, the nonlinear effective area of the RDF is as small as approximately 26 μm², and a transmission loss occurred in the RDF is as large as approximately 0.25 dB/km. The nonlinear effect $\phi_{NL}$ in the transmission line is calculated according to the formula (3), and then an average nonlinear effective area in the longitudinal direction of the transmission line with respect to the nonlinear effective area of the transmission line formed with the DSF alone is calculated to be approximately 49 μm². Moreover, a transmission loss occurred in the transmission line is approximately 0.225 dB/km. In this state, the magnitude of improvement I in a transmission characteristic is calculated according to the formula (4). The results of calculation are plotted as white star mark in FIG. 17.

Now, consideration is taken into the fact that the nonlinear effective area of a DSF generally employed as a transmission line is approximately 50 μm² and a transmission loss occurred in the DSF is 0.20 dB/km. According to the configurations of the WDM optical transmission systems described in the articles (2) and (3), wavelength dispersion and wavelength dispersion-slope can be compensated for. However, the results of improving a nonlinear effective area and transmission loss are limited. Compared with the transmission characteristic of the transmission line formed with the DSF alone, the transmission characteristic of the hybrid transmission line is thought to be poorer by approximately 0.85 dB.

The problems underlying the WDM optical transmission system described in the foregoing article (4) will be discussed below.

The RDF referred to in the article (4) is designed to compensate for wavelength dispersion accumulated by the first-half 1.3 μm zero-dispersion SMF in a state where the length of transmission line is relatively short. The magnitude of compensation for wavelength dispersion per distance must therefore be relatively large. This results in a large transmission loss and a small nonlinear effective area. The thesis (4) does not refer to the nonlinear effective area of the RDF. The nonlinear effective area of an RDF described in the article (6) will therefore be used as a reference, because the wavelength dispersion per distance in this RDF is equivalent to approximately −100 μs/nm/km.

The nonlinear effective area of the first-half 1.3 μm zero-dispersion SMF is as large as approximately 80 μm². A transmission loss occurred in the SMF is as small as approximately 0.20 dB/km. By contrast, the nonlinear effective area of the second-half RDF is as small as approximately 20 μm², and a transmission loss occurred in the RDF is as large as approximately 0.5 dB/km. A nonlinear effect $\phi_{NL}$ of the transmission line is calculated according to the formula (3), and then an average nonlinear effective area in the longitudinal direction of the transmission line formed with the DSF alone is calculated to be approximately 68 m². Moreover, a transmission loss occurred in the transmission line is approximately 0.23 dB/km. The magnitude of improvement I in a transmission characteristic is calculated according to the formula (4). The results of calculation are plotted as black star mark in FIG. 17. Consideration is taken into the nonlinear effective area of the DSF and a transmission loss occurred in the DSF. Even in the configuration of the WDM optical transmission system described in the article (4), the results of improving the nonlinear effective area and transmission loss are limited. Compared with the transmission characteristic of the transmission line formed with the DSF alone, the transmission characteristic of the hybrid transmission line is thought to be poorer by approximately 0.19 dB.

As mentioned above, as far as the conventional WDM optical transmission systems described in the articles are concerned, although wavelength dispersion and wavelength dispersion-slope may be compensated for, the result of improving the transmission characteristic is unsatisfactory.

Moreover, a WDM optical transmission system may be configured in such a manner that repeaters are linked using a hybrid transmission line made by combining a 1.3 μm zero-dispersion SMF and an RDF. In this case, when a cumulative value of wavelength dispersion (cumulative wavelength dispersion) generated in each inter-repeater segment is positive, the peak value of optical power becomes large due to compressed optical pulses, to thereby become more susceptible to a nonlinear effect.

The foregoing problems will be described by taking the WDM optical transmission system described in the article (2) for instance.

According to the system configuration described in the article (2), a transmission line made by combining a 1.3 μm zero-dispersion SMF and an RDF is laid down as each inter-repeater segment. A transmission line formed with a dispersion compensation fiber for compensating for cumulative wavelength dispersion generated in a plurality of inter-repeater segments is laid down at intervals of a given number of inter-repeater segments.

FIGS. 18A and 18B graphically show an example of wavelength dispersion map created using the parameters mentioned in the article (2). FIG. 18A shows a change in wavelength dispersion over ten inter-repeater segments. FIG. 18B shows a change in wavelength dispersion over one hundred inter-repeater segments.

In the example shown in FIGS. 18A and 18B, the length of one inter-repeater segment is 50 km, and cumulative wavelength dispersion is compensated for at intervals of five inter-repeater segments. A compensation interval of cumulative wavelength dispersion is five times as large as the inter-repeater segment. An averaged wavelength dispersion in the transmission distance direction is −225 ps/nm/km. The value of cumulative wavelength dispersion becomes positive in first, second, sixth, and seventh inter-repeater segments. The peak value of optical power gets larger due to effect of optical pulse compression, to thereby become more susceptible to a nonlinear effect. Moreover, since the compensation interval of cumulative wavelength dispersion is relatively short, the value of cumulative wavelength dispersion is frequently reset to zero. There arises a possibility that the waveform is distorted due to the nonlinear effect.

FIGS. 19A and 19B show an example of wavelength dispersion map, wherein a compensation interval of cumulative wavelength dispersion is ten times as large as an inter-repeater segment. An averaged wavelength dispersion in the transmission distance direction is −225 ps/nm/km. Even in this case, the value of cumulative wavelength dispersion becomes positive in the first to fourth inter-repeater segments. The peak value of optical power increases due to effect of optical pulse compression, to thereby become susceptible to a nonlinear effect. In a region where the value of cumulative wavelength dispersion is positive, WDM signal light is propagated over successive segments, to thereby be more susceptible to a larger nonlinear effect due to the optical pulse compression.

Incidentally, it is pointed out by H. Taga et al. in their article (7) entitled "Performance Evaluation of the Different Types of Fiber-Wavelength dispersion Equalization for IM-DD Ultralong-Distance Optical Communication Systems with Er-Doped Fiber Amplifiers" (IEEE Journal of Lightwave Technology, Vol. 12, No. 9, September, 1994) that a transmission characteristic gets worse with an increase in the number of opportunities on which light is propagated over a transmission line in a region where the value of cumulative wavelength dispersion is positive.

SUMMARY OF THE INVENTION

The present invention is intended to overcome the foregoing problems. An object of the present invention is to provide a WDM optical transmission system having an excellent transmission characteristic by employing a hybrid transmission line made by combining an optical fiber having positive wavelength dispersion, and an optical fiber having negative wavelength dispersion, under optimal conditions. Another object of the present invention is to provide a WDM optical transmission system in which a nonlinear effect is prevented from being generated by suppressing a state in which the value of cumulative wavelength dispersion becomes positive, to thereby improve a transmission characteristic.

For accomplishing the above objects, according to one aspect of the present invention, there is provided a WDM optical transmission system comprising: an optical transmission line which has a first transmission segment formed by linking together a first optical fiber having positive wavelength dispersion relative to a signal light wavelength and a relatively large nonlinear effective area and a second optical fiber having negative wavelength dispersion relative to a signal light wavelength and a relatively small nonlinear effective area; and an optical amplification unit for amplifying wavelength division multiplexed signal light propagated over the optical transmission line, wherein the wavelength division multiplexed signal light input to the optical transmission line is sent to the optical amplification unit after propagated successively over the first optical fiber and second optical fiber of the first transmission segment, and then sent to the optical amplification unit, and wherein the optical transmission line is such that the ratio of the length of the second optical fiber to the length of the first transmission segment is 20% or more and 40% or less.

According to the above configuration, the lengths of the first optical fiber and second optical fiber constituting the first transmission segment of the optical transmission line are optimized not only for compensating for wavelength dispersion and wavelength dispersion-slope but also for diminishing a nonlinear effect and a transmission loss. This leads to an improved transmission characteristic.

Moreover, in the WDM optical transmission system described above, the optical transmission line may have a plurality of first transmission segments, the optical amplification unit may have a plurality of optical amplifiers installed between the respective first transmission segments. According to this configuration, the optical transmission line has a plurality of first transmission segments each of which consists of the first optical fiber and second optical fiber. WDM signal light input to the optical transmission line will be propagated over the respective first transmission segments in succession while being amplified by the optical amplifiers.

Furthermore, the optical transmission line is preferably such that the sum of the value of cumulative wavelength dispersion generated in the first optical fiber and the value of cumulative wavelength dispersion generated in the second optical fiber is negative. In this case, the cumulative wavelength dispersion generated in the first transmission segments becomes negative, to thereby achieve the transmission line in which a nonlinear effect hardly be generated.

In addition, the configuration may be such that the optical transmission line has a second transmission segment formed with a third optical fiber having positive wavelength dispersion relative to a signal light wavelength, and the second transmission segment is disposed at each of intervals of a preset number of first transmission segments in order to compensate for negative cumulative wavelength dispersion generated in the first transmission segments. In this configuration, negative cumulative wavelength dispersion generated in the first transmission segments is compensated for by the second transmission segments separated from one another by a required compensation interval. Consequently, the generation of a nonlinear effect can be suppressed and deterioration in a transmission characteristic due to cumulative wavelength dispersion can be prevented.

Moreover, the aforesaid WDM optical transmission system may include a residual wavelength dispersion compensation unit for compensating for wavelength dispersion remaining in wavelength division multiplexed signal light having been propagated over the optical transmission line. Furthermore, the WDM optical transmission system may include a residual wavelength dispersion-slope compensation unit for compensating for wavelength dispersion-slope remaining in wavelength division multiplexed signal light having been propagated over the optical transmission line.

According to this configuration, wavelength dispersion that could not be fully compensated for within the first and second transmission segments can be compensated for by the residual wavelength dispersion compensation unit. Moreover, wavelength dispersion-slope that could not be fully compensated for within the first and second transmission segments can be compensated for by the residual wavelength dispersion-slope compensation unit. Thereby, a more excellent transmission characteristic can be obtained.

According to another aspect of the present invention, there is provided a WDM optical transmission system comprising a wavelength dispersion applying device for applying a preset negative wavelength dispersion to wavelength division multiplexed signal light to be input to the foregoing optical transmission line. Otherwise, light may be applied with wavelength dispersion for each wavelength to be wavelength division multiplexed. The wavelength dispersion applying device preferably applies negative wavelength dispersion whose absolute value is equal to or greater than the absolute value of cumulative wavelength dispersion generated in the first optical fiber.

According to this configuration, WDM signal light is propagated over the optical transmission line in a state of negative cumulative wavelength dispersion. Therefore, the probability of generation of a nonlinear effect is lowered, and a transmission characteristic can be improved.

Moreover, the WDM optical transmission system may include a wavelength dispersion compensating device for compensating wavelength division multiplexed signal light output from the optical transmission line for negative wavelength dispersion applied by the wavelength dispersion applying device. In this case, after WDM signal light is propagated over the optical transmission line, wavelength dispersion that has been applied to the WDM signal light when input to the optical transmission line is compensated for by the wavelength dispersion compensating device, thereby, performing more assuredly the wavelength dispersion compensation of the WDM signal light.

According to another aspect of the present invention, there is provided a WDM optical transmission system having an optical transmission line including the foregoing first and second transmission segments, wherein the magnitude of compensation achieved within the second transmission segment is insufficient for negative cumulative wavelength dispersion generated in a preset number of first transmission segments of the optical transmission line. More particularly, a compensation ratio of cumulative wavelength dispersion in the second transmission segment is preferably 90% or more and 95% or less.

According to this configuration, cumulative wavelength dispersion of WDM signal light having been propagated over the second transmission segments becomes negative. Consequently, a nonlinear effect will hardly be generated and a transmission characteristic can be improved.

Moreover, the aforesaid aspects of the present invention may be combined to be implemented in a WDM optical transmission system. By combining the respective aspects, a transmission characteristic can be improved more greatly.

Other objects, features, and advantages of the present invention will be apparent from the description below on embodiments associated with accompanying drawings.

BRIEF DESCRIPTION OF THE DRAWINGS

FIG. 11 is a block diagram showing a basic configuration of a second embodiment of the present invention;

FIG. 12A shows wavelength dispersion generated in a segment having a transmission distance of up to 500 km, and FIG. 12B shows wavelength dispersion generated in a segment having a transmission distance of up to 5000 km;

FIG. 13A and FIG. 13B show a wavelength dispersion map in another configuration relevant to the second embodiment, FIG. 13A shows wavelength dispersion generated in a segment having a transmission distance of up to 500 km, and FIG. 13B shows wavelength dispersion generated in a segment having a transmission distance of up to 5000 km;

FIG. 18A shows wavelength dispersion generated in a segment having a transmission distance of up to 500 km, and FIG. 18B shows wavelength dispersion generated in a segment having a transmission distance of up to 5000 km; FIG. 19A shows wavelength dispersion generated in a segment having a transmission distance of up to 500 km, and FIG. 19B shows wavelength dispersion generated in a segment having a transmission distance of up to 5000 km.

DESCRIPTION OF PREFERRED EMBODIMENTS

Embodiments of the present invention will be described in conjunction with the drawings.

Figure 1:
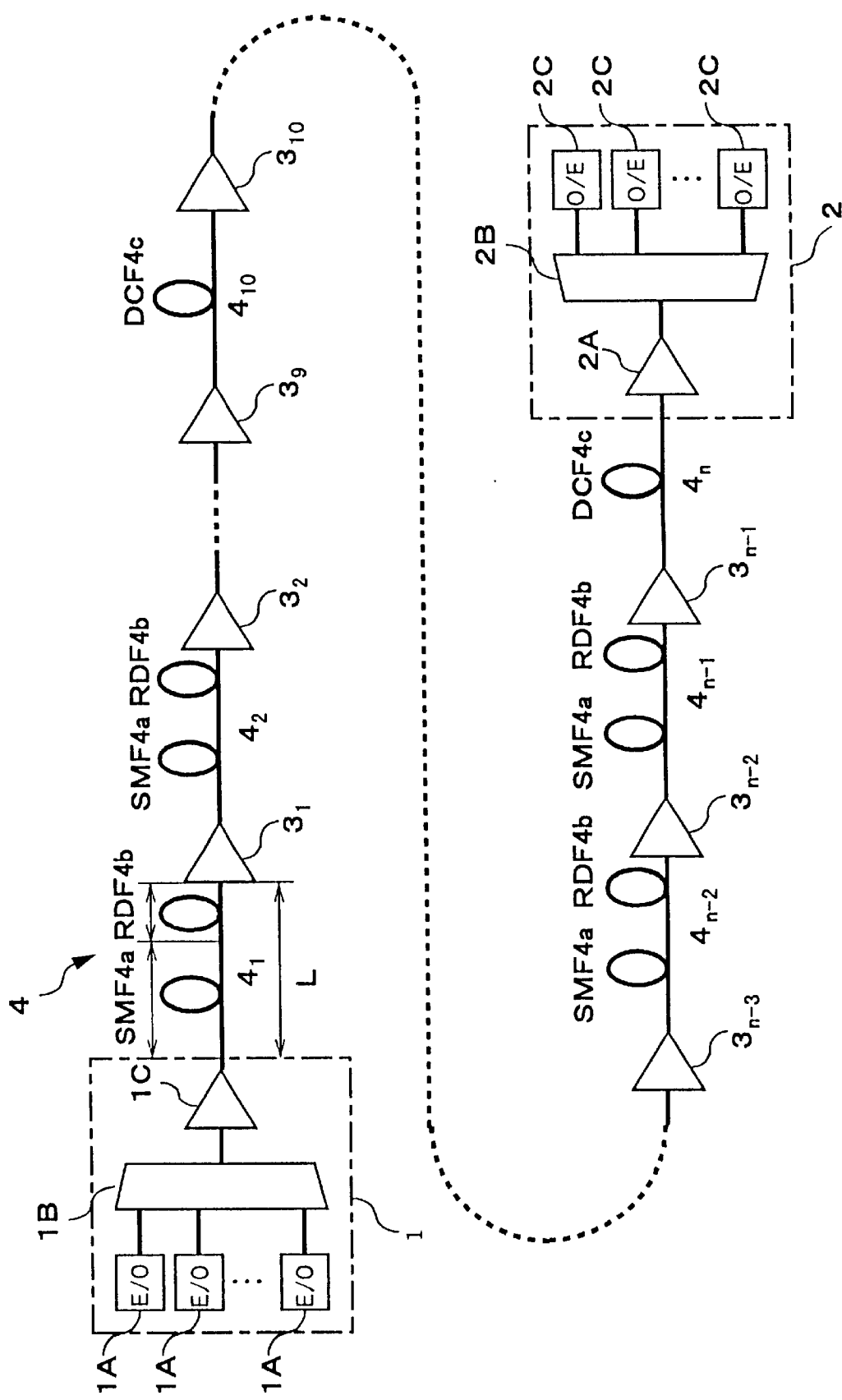
FIG. 1 is a block diagram showing a basic configuration of a first embodiment of the present invention.

FIG. 1 is a block diagram showing a basic configuration of a WDM optical transmission system in accordance with a first embodiment.

The WDM optical transmission system shown in FIG. 1 consists of, for example, an optical transmitter station 1, an optical receiver station 2, a plurality of optical amplifiers (optical repeaters) $3_1$, $3_2$, etc., and an optical fiber transmission line 4. The plurality of optical amplifiers is arranged between the transmitter and receiver stations at required intervals. The optical fiber transmission line 4 links the optical transmitter station 1, the respective optical amplifiers $3_1$, $3_2$, etc., and the optical receiver station 2.

The optical transmitter station 1 includes a plurality of optical transmitters (E/O) 1A, a multiplexer 1B, and a post-amplifier 1C. The plurality of optical transmitters (E/O) 1A outputs a plurality of optical signals having different wavelengths. The multiplexer 1B wavelength division multiplexes the plurality of optical signals having different wavelengths. The post-amplifier 1C amplifies WDM signal light output from the multiplexer 1B to a required level and outputs amplified signal light to the optical fiber transmission line 4.

The optical receiver station 2 includes a preamplifier 2A, a demultiplexer 2B, and a plurality of optical receivers (O/E) 2C. The preamplifier 2A amplifies WDM signal light transmitted over the optical fiber transmission line 4 to a given level. The demultiplexer 2B splits output light of the preamplifier 2A into a plurality of optical signals according to wavelengths thereof. The plurality of optical receivers (O/E) 2C receives a plurality of optical signals.

The optical amplifiers $3_1$, $3_2$, etc. are known optical amplifiers capable of collectively amplifying WDM signal light that has reached the respective positions thereof on the optical fiber transmission line 4.

The optical fiber transmission line 4 consists of a first inter-repeater segment $4_1$ linking the optical transmitter station 1 and optical amplifier $3_1$, the second to n−1th inter-repeater segments $4_2$ to $4_{n-1}$ linking the optical amplifiers $3_1$ to $3_{n-1}$, and the nth inter-repeater segment $4_n$ linking the optical amplifier $3_{n-1}$ and optical receiver station 2.

FIG. 1 shows an example of configurations in which, for example, cumulative wavelength dispersion generated in the first to ninth inter-repeater segments is compensated for in the tenth inter-repeater segment, that is, cumulative wavelength dispersion is compensated for in every tenth inter-repeater segment. In this case, a hybrid transmission line is adapted to inter-repeater segments (the first to ninth inter-repeater segments and so on) in which cumulative wavelength dispersion is not compensated for. The hybrid transmission line has a first half thereof (transmitter side) formed with a 1.3 μm zero-dispersion SMF 4a serving as a first optical fiber having positive wavelength dispersion and positive wavelength dispersion-slope for a wavelength band of WDM signal light and has a second half thereof (receiver side) formed with an RDF 4b serving as a second optical fiber having negative wavelength dispersion and negative wavelength dispersion-slope. A transmission line formed with a dispersion compensation fiber (DCF) 4c is adapted to inter-repeater segments (the tenth inter-repeater segment and so on) in which cumulative wavelength dispersion is compensated for. The DCF 4c serves as a third optical fiber having wavelength dispersion reciprocal to cumulative wavelength dispersion generated in the front nine inter-repeater segments.

Herein, the first to ninth inter-repeater segments and so on formed with the hybrid transmission line correspond to a first transmission segment of the optical transmission line. The tenth inter-repeater segment and so on formed with the transmission line formed using the DCF 4c alone correspond to a second transmission segment of the optical transmission line.

The 1.3 μm zero-dispersion SMF 4a is a typical optical fiber having required wavelength dispersion-slope wherein wavelength dispersion becomes zero about 1.3 μm, and wavelength dispersion becomes large as the wavelength of light increases. The 1.3 μm zero-dispersion SMF 4a has positive wavelength dispersion in WDM signal light wavelength band of 1.55 μm and the like. The 1.3 μm zero-dispersion SMF 4a has characteristics of, as mentioned previously, a large nonlinear effective area and a small transmission loss.

The RDF 4b is designed by devising the material and structure of an optical fiber so that the RDF 4b has wavelength dispersion and wavelength dispersion-slope reciprocal to those of the 1.3 μm zero-dispersion SMF 4a for the wavelength band of 1.55 μm and the like. The RDF 4b can therefore compensate for wavelength dispersion generated in the 1.3 μm zero-dispersion SMF 4a. The RDF 4b is characterized in that the nonlinear effective area thereof is smaller than that of the 1.3 µm zero-dispersion SMF 4a and a transmission loss thereof is relatively large.

It is preferable that the sum of a value of cumulative wavelength dispersion in the 1.3 µm zero-dispersion SMF 4a and a value of cumulative wavelength dispersion in the RDF 4b becomes negative, in other words, the value of cumulative wavelength dispersion generated in the whole hybrid transmission line becomes negative by setting so that compensation by the RDF 4b for wavelength dispersion generated in the 1.3 µm zero-dispersion SMF 4a will be slightly excessive. This is to prevent such a state where, as mentioned previously, when cumulative wavelength dispersion becomes positive, the peak value of optical power increases due to optical pulse compression effect and consequently, light becomes more susceptible to be under a nonlinear effect. However, the present invention is not limited to this mode.

The lengths of the 1.3 µm zero-dispersion SMF 4a and RDF 4b are set so that a ratio of the length of the RDF 4b to the length of one inter-repeater segment (hereinafter, referred to as an RDF ratio) will be 20% or more and 40% or less. The reasons why the RDF ratio is set this way will be described later.

The DCF 4c is formed using an optical fiber having positive wavelength dispersion so as to be able to compensate for negative cumulative wavelength dispersion generated in the pre-stage nine preceding inter-repeater segments. Specifically, the 1.3 µm zero-dispersion SMF used as the first-half optical fiber of the hybrid transmission line may be used as the DCF 4c.

The DCF 4c is adapted to every tenth inter-repeater segment in the present embodiment. A compensation interval of cumulative wavelength dispersion is not limited to this one. However, as mentioned previously, when the compensation interval of cumulative wavelength dispersion is too short, there is a possibility that the cumulative wavelength dispersion is frequently reset to zero, and consequently light may be affected by a nonlinear effect. Therefore, it is advantageous that the compensation interval of cumulative wavelength dispersion is made to be long enough. It is considered to be preferable that the compensation interval is made to be ten or more times longer than the inter-repeater segment. Moreover, for example, in a case that the sum of the cumulative wavelength dispersion in the 1.3 µm zero-dispersion SMF 4a and the cumulative wavelength dispersion in the RDF 4b is set to zero, the DCF 4c (second transmission segment) for compensating for cumulative wavelength dispersion may be omitted.

Now, a description will be made of practical conditions for setting the hybrid transmission line made by combining the 1.3 µm zero-dispersion SMF 4a and RDF 4b.

To begin with, a discussion will be made on a RDF ratio, so as to determine conditions for setting a hybrid transmission line capable of improvement of a transmission characteristic thereof.

Figure 2:
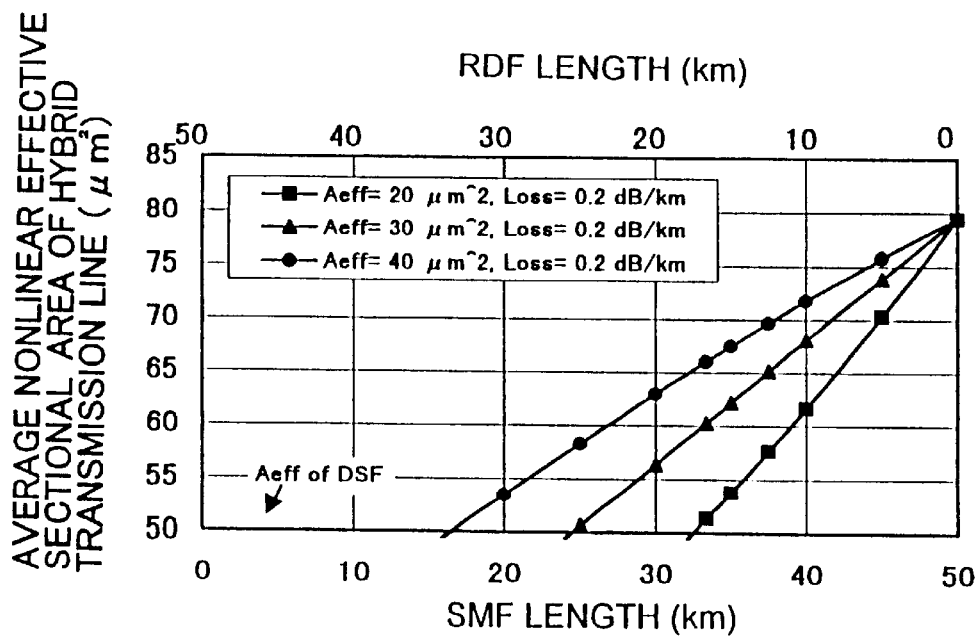
FIG. 2 relates to the first embodiment and graphically shows the results of calculation for an average nonlinear effective area of a hybrid transmission line.

For example, in a case that the lengths of the 1.3 µm zero-dispersion SMF 4a and RDF 4b are changed on the assumption that the length of one inter-repeater segment of a transmission line is 50 km, an average nonlinear effective area in a longitudinal direction of a hybrid transmission line is calculated relative to a nonlinear effective area of a transmission line formed with a DSF alone which is a typical transmission fiber. Specifically, a nonlinear effect $\phi_{NL}$ in the hybrid transmission line is calculated according to the aforesaid formula (3). The nonlinear effect $\phi_{NL}$ is standardized with a nonlinear effect in the transmission line formed with the DSF alone. The nonlinear effective area of the DSF is divided by the value of the standardized nonlinear effect, to calculate an average nonlinear effective area in the hybrid transmission line relative to the nonlinear effective area of the transmission line formed with the DSF alone. Herein, the data listed as Table 1 is used as characteristic values of the respective optical fibers. A transmission loss in the RDF 4b is fixed to 0.2 dB/km, and the nonlinear effective area is changed in three steps of 20, 30, and 40 $\mu m^2$. FIG. 2 graphically shows the results of calculating an average nonlinear effective area.

As shown in FIG. 2, the smaller the RDF ratio is (the longer the first-half 1.3 µm zero-dispersion SMF 4a is and the shorter the second-half RDF 4b is), the larger the average nonlinear effective area in the longitudinal direction of the hybrid transmission line is. For example, assuming that the RDF ratio is 50%, when the nonlinear effective area of the RDF 4b is 40 $\mu m^2$, the average nonlinear effective area is approximately 58 $\mu m^2$. Assuming that the nonlinear effective area of the RDF 4b is 20 $\mu m^2$, the average nonlinear effective area is equal to or smaller than 50 $\mu m^2$ to be smaller than the nonlinear effective area of the DSF Consequently, even when the RDF ratio is set to about 50%, a relaxation degree of a nonlinear effect is considered to be smaller than that attained by employing the transmission line formed with the DSF alone.

By contrast, assuming that the RDF ratio is 20%, when the nonlinear effective area of the RDF 4b is 40 $\mu m^2$, the average nonlinear effective area is approximately 72 $\mu m^2$. When the nonlinear effective area of the RDF 4b is 20 $\mu m^2$, the average nonlinear effective area is approximately 62 $\mu m^2$. Consequently, if the RDF ratio is set to about 20%, when the nonlinear effective area of the RDF 4b is 40 $\mu m^2$, a relaxation degree of a nonlinear effect is considered to be higher by approximately 1.6 dB in comparison with that attained in the transmission line formed with the DSF alone. When the nonlinear effective area of the RDF 4b is 20 $\mu m^2$, a relaxation degree of a nonlinear effect is considered to be higher by approximately 0.9 dB. Consequently, the outputs of the optical amplifiers interconnected over the hybrid transmission line can be raised proportionally to the relaxation degree.

Figure 3:
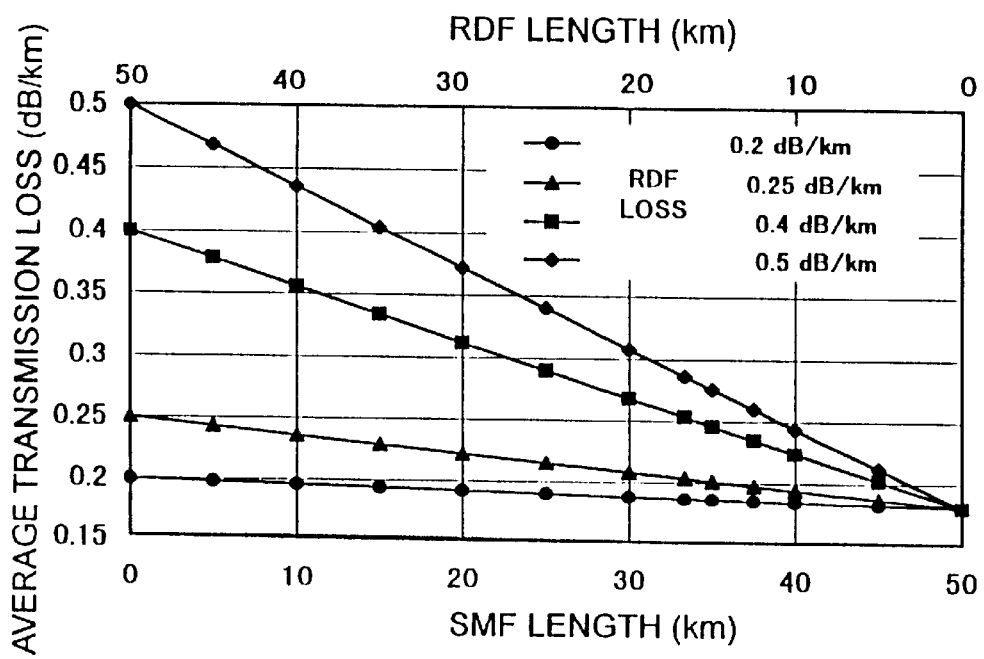
FIG. 3 relates to the first embodiment and graphically shows the results of calculation for an average transmission loss of the hybrid transmission line.

Thereafter, an average transmission loss in a longitudinal direction of a hybrid transmission line formed by combining the 1.3 µm zero-dispersion SMF 4a and RDF 4b is calculated. Herein, for example, a transmission loss in the RDF 4b is varied stepwise within a range from 0.2 to 0.5 dB/km. FIG. 3 shows the results of calculation of an average transmission loss.

As shown in FIG. 3, a transmission loss in the 1.3 µm zero-dispersion SMF 4a is as small as 0.18 dB/km. Consequently, the larger the ratio of the 1.3 µm zero-dispersion SMF 4a to one inter-repeater segment is (the smaller the RDF ratio is), the smaller the average transmission loss is. In other words, the average transmission loss per one inter-repeater segment can be made smaller when the RDF ratio is 20% than when the RDF ratio is 50%. This is advantageous in improving a transmission characteristic.

Next, while consideration is taken into the above results, magnitude of improvement I in a transmission characteristic of a hybrid transmission line relative to a transmission line formed with a DSF alone will be discussed in conjunction with the formula (4).

Figure 4:
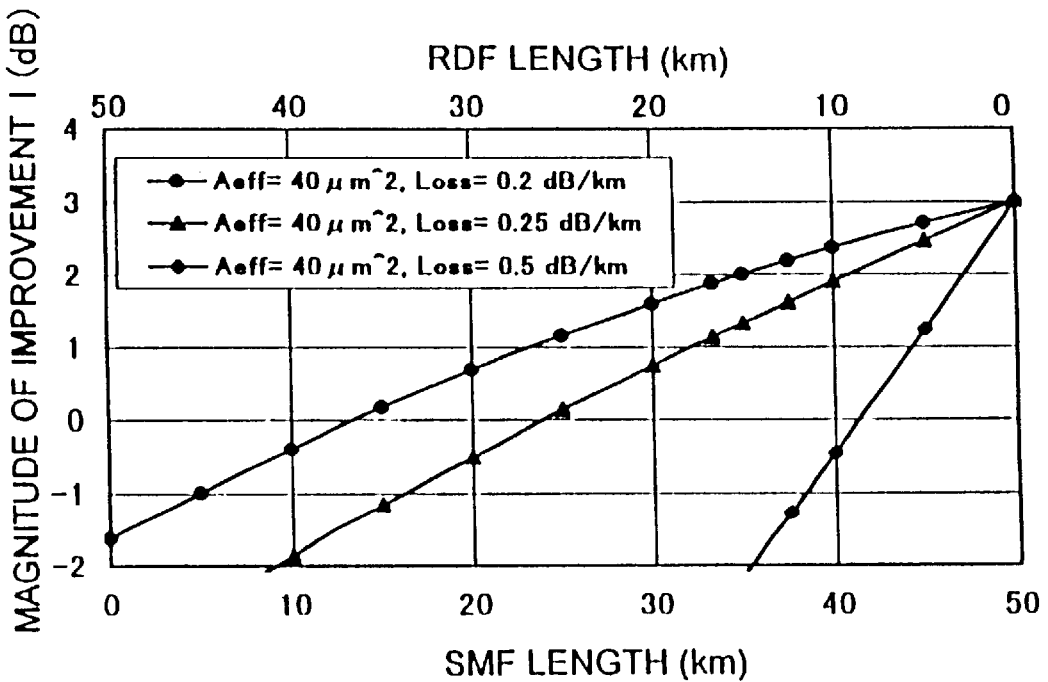
FIG. 4 relates to the first embodiment and graphically shows the results of calculation for the magnitude of improvement in a transmission characteristic in relation to RDFs causing different transmission losses.

To begin with, the nonlinear effective area of the RDF 4b is fixed to 40 $\mu m^2$, and a transmission loss in the RDF 4b is varied in three steps of 0.2, 0.25, and 0.5 dB/km respectively. The magnitude of improvement I is then calculated. FIG. 4 shows the results of calculation.

In FIG. 4, for example, assuming that the transmission loss in the RDF 4b is 0.25 dB/km, when the RDF ratio is 50%, the magnitude of improvement I in a transmission characteristic is approximately 0.1 dB. By contrast, when the RDF ratio is 20%, the magnitude of improvement I in a transmission characteristic is approximately 1.9 dB. The degree of improvement is higher by approximately 1.8 dB than that attained when the RDF ratio is 50%. Apparently, the smaller the RDF ratio in the hybrid transmission line is, the higher the degree of improvement in a transmission characteristic is. Moreover, when the transmission loss in the RDF 4b increases up to 0.5 dB/km, the RDF ratio must be set to approximately 15% or less, so that the degree of improvement in a transmission characteristic can be attained.

However, it is desired that normally, a transmission loss in an optical fiber used as a transmission line is 0.25 dB/km or less. Therefore, although the RDF 4b with a transmission loss of 0.5 dB/km may be realized, this kind of RDF 4b is regarded to be inappropriate for a part of a transmission line.

Figure 5:
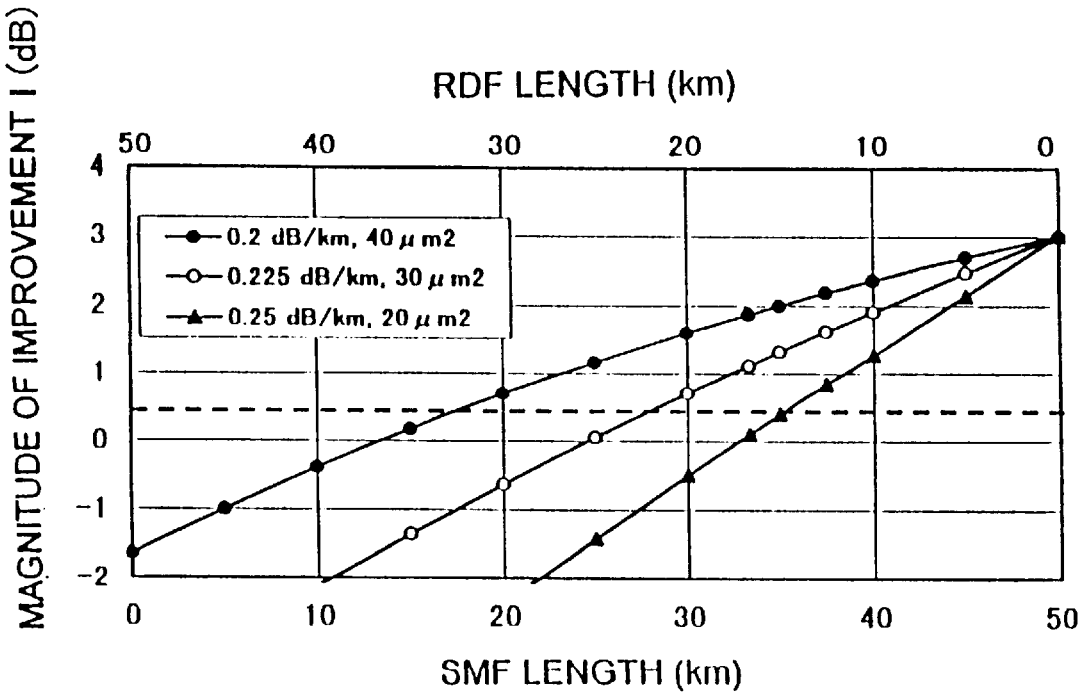
FIG. 5 relates to the first embodiment and graphically shows the results of calculation for the magnitude of improvement in a transmission characteristic in relation to RDF feasible as a transmission line.

As a combination of characteristic parameters of the RDF 4b that is a feasible transmission line, the nonlinear effective area of 40 $\mu m^2$ and the transmission loss of 0.2 dB/km deemed to be optimal values, the nonlinear effective area of 20 $\mu m^2$ and the transmission loss of 0.25 dB/km deemed to be worst values, and the nonlinear effective area of 30 $\mu m^2$ and the transmission loss of 0.225 dB/km to be average values are assumed, respectively. The magnitude of improvement I in a transmission characteristic of a hybrid transmission line is then calculated based on these values. FIG. 5 graphically shows the results of calculation.

As apparent from FIG. 5, when the RDF 4b of the average nonlinear effective area of 30 $\mu m^2$ and transmission loss of 0.225 dB/km is used as a reference, the RDF ratio must be 40% or less, so that the magnitude of improvement I in a transmission characteristic reaches 0.5 dB or more. Herein, the reason why the magnitude of improvement I in a transmission characteristic must be 0.5 dB or more will be described. Namely, when consideration is taken into a connection loss or the like due to the connection between the 1.3 $\mu m$ zero-dispersion SMF 4a and RDF 4b, it is deemed to be proper that the magnitude of improvement I by which a transmission characteristic can be actually expected to be improved is set to be 0.5 dB or more. As far as the hybrid transmission line composed of the 1.3 $\mu m$ zero-dispersion SMF 4a and RDF 4b is concerned, it can be judged to be desirable that the RDF ratio is set to 40% or less.

Next, the RDF ratio will be discussed in terms of compensation of cumulative wavelength dispersion generated in a hybrid transmission line.

Figure 6:
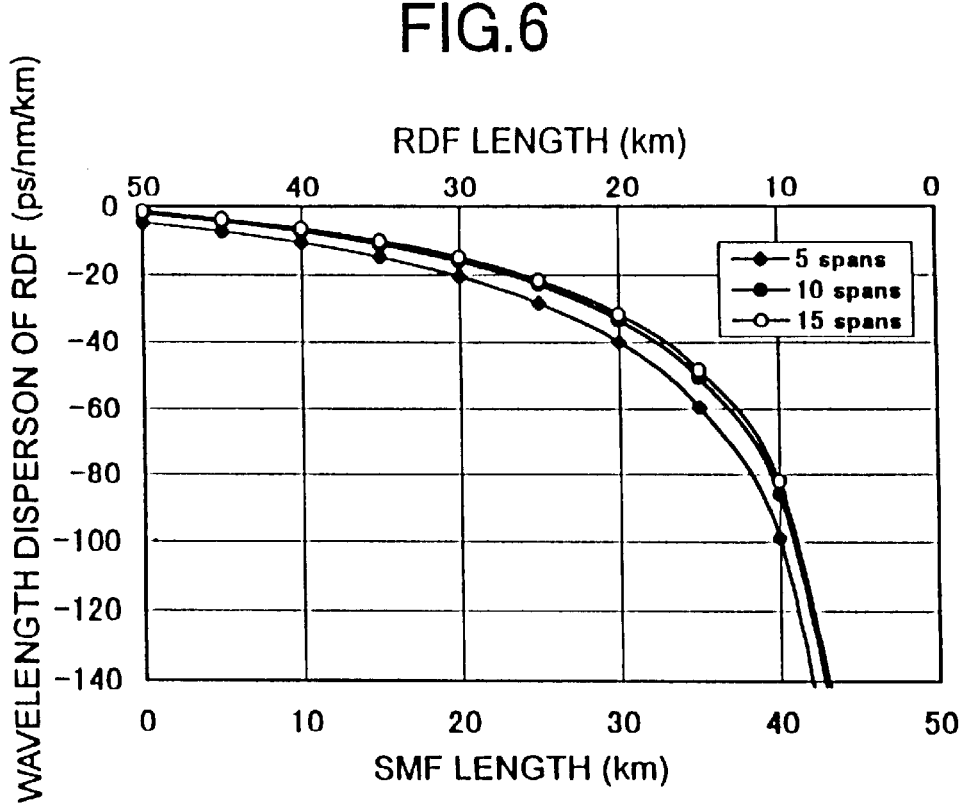
FIG. 6 relates to the first embodiment and graphically shows the results of calculation for wavelength dispersion required to RDFs.

Herein, assuming that as the DCF 4c for compensating for cumulative wavelength dispersion, a 1.31 $\mu m$ zero-dispersion SMF is used for the whole length (50 km) of one inter-repeater segment, a compensation interval of cumulative wavelength dispersion is set to 5, 10, and 15 spans (inter-repeater segments) respectively. The rate of wavelength dispersion required of the RDF 4b of each hybrid transmission line is calculated according to different RDF ratios. FIG. 6 shows the results of calculation.

As shown in FIG. 6, even when the compensation interval of cumulative wavelength dispersion is varied, the rate of wavelength dispersion required of the RDF 4b of each hybrid transmission line is retained at nearly the same value.

For example, in a case that the compensation interval of cumulative wavelength dispersion is 10 spans, when the RDF ratio is set to 33%, 25%, and 20% respectively, the rate of wavelength dispersion of RDF4b in a wavelength of 1560 nm is set to −44, −65, and −86 ps/nm/km respectively. In this case, cumulative wavelength dispersion in 10 spans can be converged to zero by the DCF 4c.

Now, reference will be made to an article (8) written by Mukasa et al. and entitled "Novel Low Non-linear Network Fiber to Compensate Dispersion at 1.55 $\mu m$ with Combination of Conventional SMF" (C-3-76, at the General Meeting of the Society of Electronic Information Communications for 1997). The article describes that when wavelength dispersion of an RDF becomes equal to or smaller than −100 ps/nm/km, a transmission loss becomes as large as 0.49 dB/km. Referring to FIG. 6, in a region in which the value of wavelength dispersion of the RDF 4b is equal to or smaller than −100 ps/nm/km (the RDF ratio is equal to or smaller than 20%), a transmission loss of the RDF increases up to approximately 0.5 dB/km.

Figure 7:
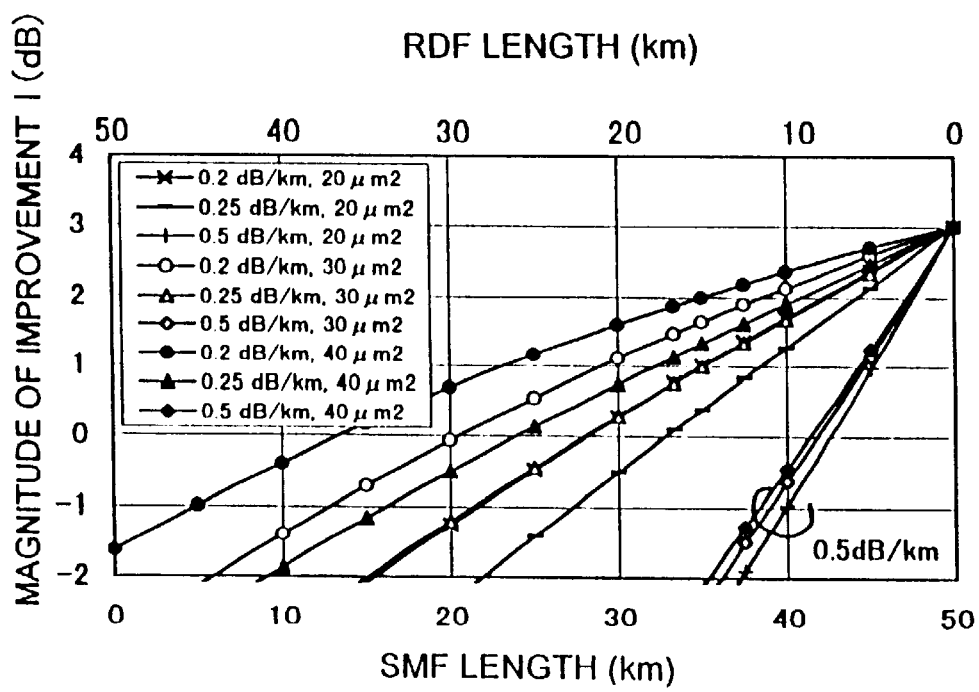
FIG. 7 relates to the first embodiment and graphically shows the results of calculation for the magnitude of improvement in transmission characteristics in relation to RDFs as various parameters.

The magnitude of improvement I in a transmission characteristic is calculated in a case that a transmission loss is varied within a range of 0.2 to 0.5 dB/km, and the nonlinear effective area of the RDF 4b is varied within a range of 20 to 40 $\mu m^2$. FIG. 7 graphically shows the results of calculation.

As shown in FIG. 7, when the transmission loss of the RDF 4b is set to 0.5 dB/km, the RDF ratio must be equal to or smaller than approximately 15%. Otherwise, the magnitude of improvement I in a transmission characteristic does not become equal to or larger than 0 dB. This demonstrates that it is unfeasible to use an RDF having a large transmission loss as a part of a hybrid transmission line. Therefore, a range of the RDF ratio in which the rate of wavelength dispersion of the RDF becomes equal to or larger than −100 ps/nm/km is thought to be advantageous as a requirement for selecting a hybrid transmission line. In short, the RDF ratio of a hybrid transmission line is thought to be advantageous to be equal to or larger than 20%.

Consequently, it can be judged that the RDF ratio of a hybrid transmission line employed as each inter-repeater segment may be set to 20% or more and 40% or less.

Next, wavelength dispersion-slope required of the RDF 4b of each hybrid transmission line will be discussed below.

Figure 8:
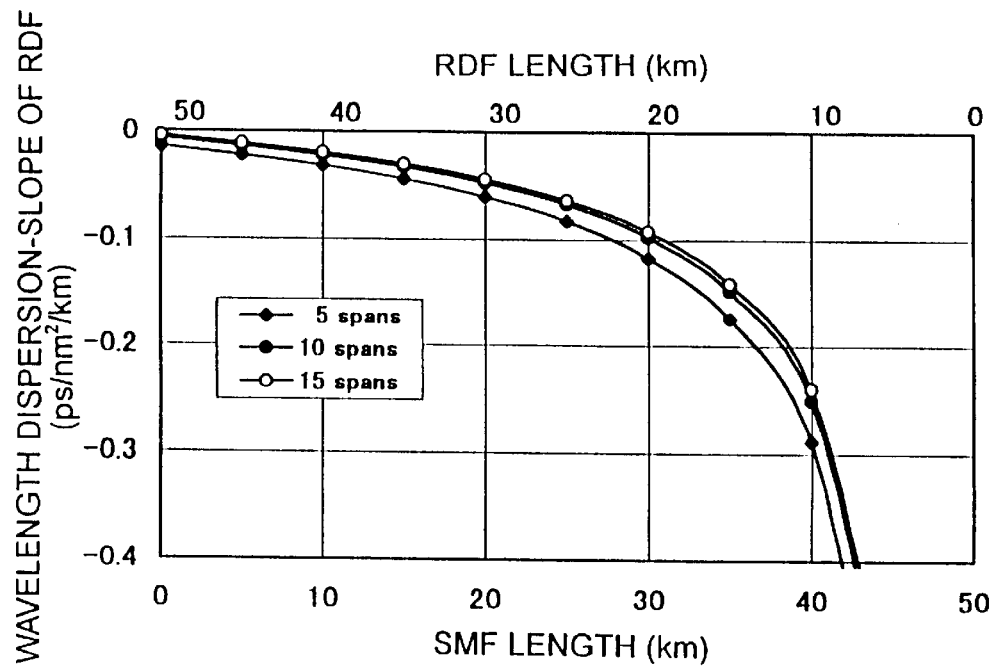
FIG. 8 relates to the first embodiment and graphically shows the results of calculation for wavelength dispersion-slope required to RDFs.

Herein, the WDM optical transmission system having the configuration shown in FIG. 1 is taken for instance. Assume that the DCF 4c is used to compensate 100% for wavelength dispersion-slope given by each inter-repeater segment formed with a hybrid transmission line. Wavelength dispersion-slope the RDF 4b of each hybrid transmission line is requested to produce will be discussed. The DCF 4c shall be formed with a 1.3 $\mu m$ zero-dispersion SMF, and an interval between compensations of cumulative wavelength dispersion shall be set to 5, 10, and 15 spans respectively. The value of wavelength dispersion-slope the RDF 4b of each hybrid transmission line is requested to produce is calculated in relation to RDF ratios. FIG. 8 graphically shows the results of calculation.

As apparent from FIG. 8, the value of wavelength dispersion-slope required of the RDF 4b of each hybrid transmission line reaches nearly the same value even when the compensation interval of cumulative wavelength dispersion is varied. For example, in a case that the compensation interval is 10 spans, when the RDF ratio are set to 33%, 25%, and 20% respectively, the value of wavelength dispersion-slope of the RDF 4b in a wavelength of 1560 nm is set to −0.13, −0.19, and −0.25 ps/nm$^2$/km respectively. In this case, the DCF 4c can compensate for wavelength dispersion-slope in 10 spans.

Figure 9:
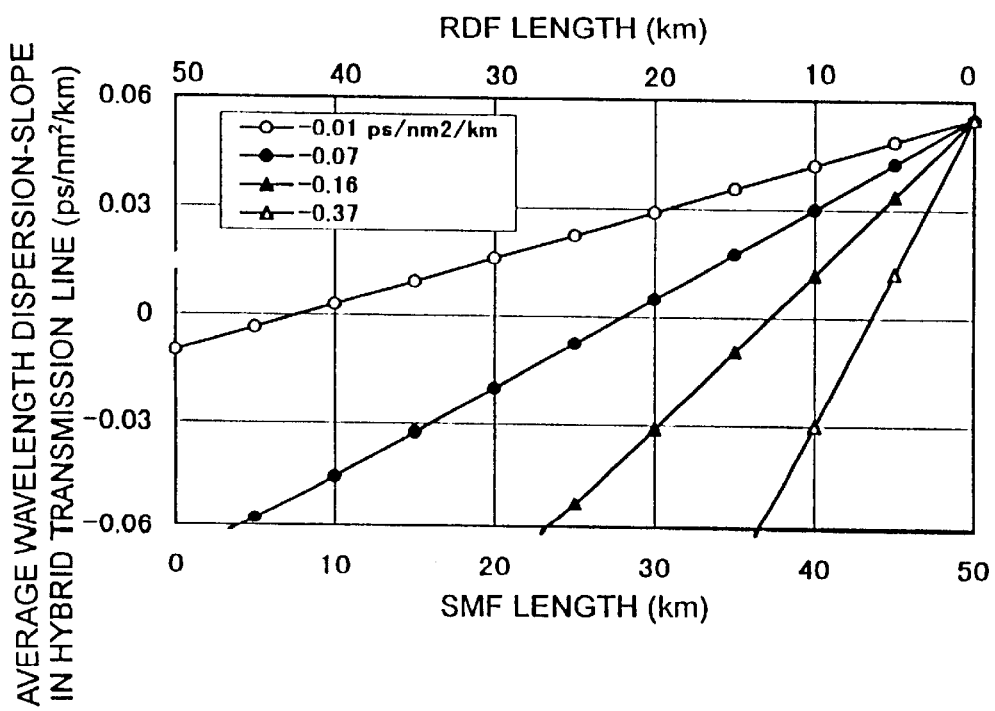
FIG. 9 relates to the first embodiment and graphically shows the results of calculation for an average wavelength dispersion-slope in the hybrid transmission line.

For a case that wavelength dispersion-slope of the RDF 4b is changed stepwise within a range from 0.01 to 0.37 ps/nm$^2$/km, an average value of wavelength dispersion-slope in a hybrid transmission line is calculated according to RDF ratios. FIG. 9 graphically shows the results of calculation.

In FIG. 9, the average wavelength dispersion-slope in a hybrid transmission line is to be various values within the range of RDF ratios from 20% or more to 40% or less. Now, reference will be made to the wavelength dependency of the Q-factor shown in FIG. 5 of an article (9) written by M. Suzuki et al. and entitled "170 Gb/s Transmission Over 10850 km Using Large Core Transmission Fiber" (PD17, OFC'98 PD). In a system such that a compensation transmission line composed of a DSF and large-core fiber (LCF) compensates for cumulative wavelength dispersion to be generated in hybrid transmission similar to the aforesaid one, as a transmission characteristic of WDM signal light with 16 channels assigned to the 1.55 μm band, the Q-factor of a high level is obtained in a wavelength band corresponding to 6 to 10 channels within the total signal light wavelength band region. An average value of wavelength dispersion-slope in the transmission line in this case is approximately 0.1 ps/nm$^2$/km. Accordingly, when the average wavelength dispersion-slope in the transmission line becomes approximately one-third of this value, the transmission characteristic is not thought to deteriorate within the total signal light wavelength band region. Consequently, it is possible to judge that the absolute value of the average value of wavelength dispersion-slope may be equal to or smaller than 0.03 ps/nm$^2$/km.

Referring to FIG. 9, in all cases that the RDF ratio is equal to or larger than 20% and equal to or smaller than 40%, the value of wavelength dispersion-slope of the RDF 4b must be equal to or larger than −0.16 ps/nm$^2$/km and equal to or smaller than −0.07 ps/nm$^2$/km, so that the average value of wavelength dispersion-slope in a hybrid transmission line falls within a range from −0.03 to +0.03 ps/nm$^2$/km.

When the RDF ratio is 20% or more and 40% or less, if the average value of wavelength dispersion-slope in a hybrid transmission line may merely fall within a range from −0.03 to +0.03 ps/nm$^2$/km, the value of wavelength dispersion-slope of the RDF 4b should be equal to or larger than −0.37 ps/nm$^2$/km and equal to or smaller than −0.01 ps/nm$^2$/km.

Furthermore, a wavelength dispersion-slope compensation rate of the RDF 4b in a hybrid transmission line will be discussed below.

Figure 10:
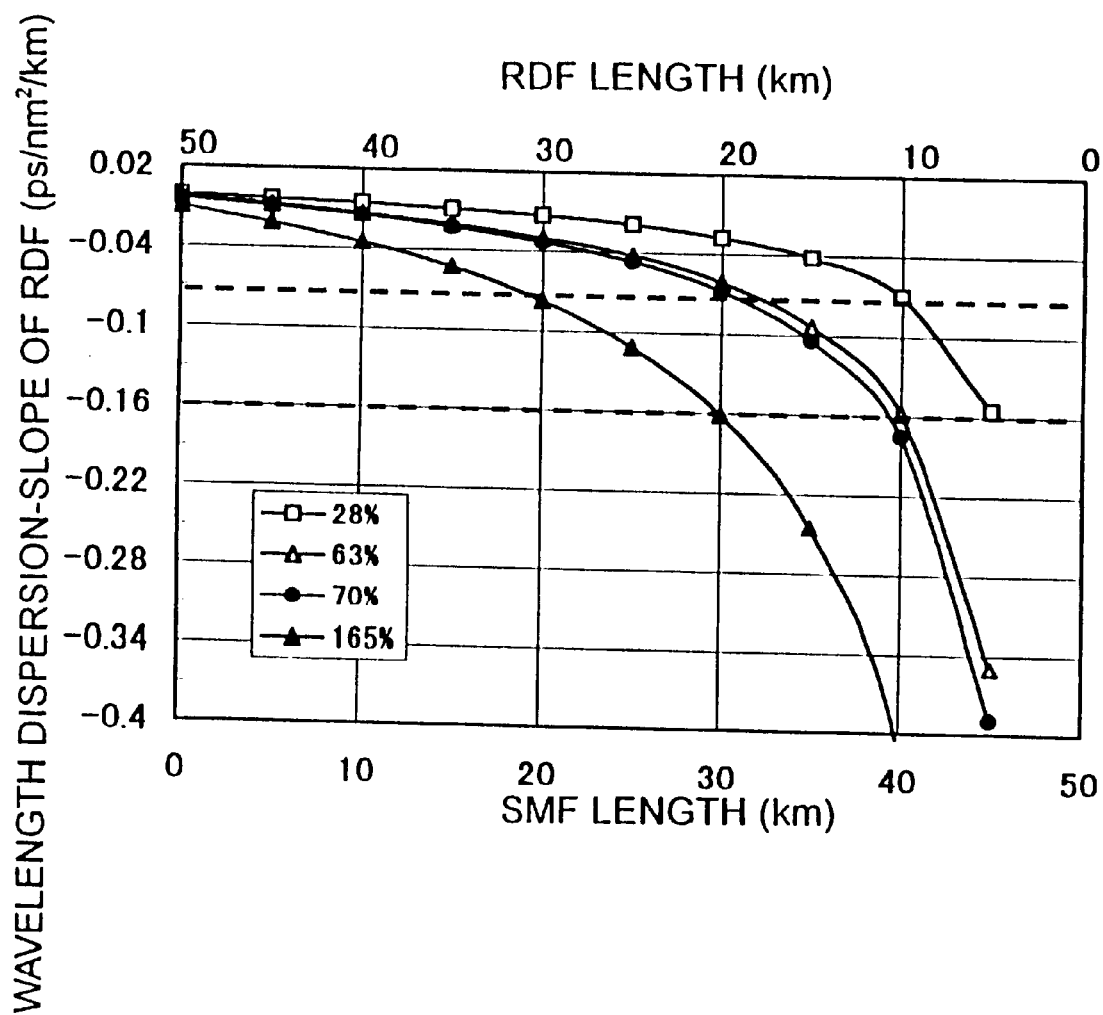
FIG. 10 relates to the first embodiment and graphically shows the results of calculation for wavelength dispersion-slope required relative to a compensation ratio of wavelength dispersion-slope in an RDF.

For example, like the system configuration shown in FIG. 1, for a case that a compensation interval of cumulative wavelength dispersion is set to 10 spans and a wavelength dispersion-slope compensation rate of the RDF 4b is changed, the value of wavelength dispersion-slope required of the RDF 4b in each hybrid transmission line is then calculated according to RDF ratios. FIG. 10 graphically shows the results of calculation.

As apparent from FIG. 10, the wavelength dispersion-slope compensation rate of the RDF 4b satisfying a requirement for the above mentioned value of wavelength dispersion-slope of the RDF 4b (−0.16 ps/nm$^2$/km or more and −0.07 ps/nm$^2$/km or less) is 28% or more and 165% or less.

Based on the aforesaid requirements for setting, the judgment can be made that, preferably, (1) the RDF ratio of a hybrid transmission line used as each inter-repeater segment is set to 20% or more and 40% or less, (2) the value of wavelength dispersion-slope of the RDF 4b in each hybrid transmission line is set to −0.16 ps/nm$^2$/km or more and −0.07 ps/nm$^2$/km or less, and (3) a wavelength dispersion-slope compensation rate of the RDF 4b in each hybrid transmission line is set to 28% or more and 165% or less.

A hybrid transmission line formed in conformity with such proper setting requirements is used to configure a WDM optical transmission system. Thereby, compared with a conventional system employing a hybrid transmission line designed by placing importance on the necessity of compensating for wavelength dispersion and wavelength dispersion-slope, an influence due to a nonlinear effect or a transmission loss can be coped with successfully. This results in a more excellent transmission characteristic.

Now, the operation in the first embodiment will be described.

In the present WDM optical transmission system, optical signals having different wavelengths and generated in the respective optical transmitters 1A in the optical transmitter station 1 are wavelength division multiplexed by the multiplexer 1B, and is amplified to a required level by the post-amplifier 1C, and then sent to the first inter-repeater segment $4_1$ of the optical fiber transmission line 4.

Within the first inter-repeater segment $4_1$, when the WDM signal light is propagated over the first-half 1.3 μm zero-dispersion SMF 4a, positive wavelength dispersion is generated. When the WDM signal light is propagated over the second-half RDF 4b, negative wavelength dispersion is generated. Since the requirements for setting a hybrid transmission line (RDF ratio and others) are optimized as mentioned previously, the probability that a nonlinear effect is generated can be suppressed. The negative wavelength dispersion generated in the RDF 4b is set to be larger than the positive wavelength dispersion generated in the 1.3 μm zero-dispersion SMF 4a. Therefore, the cumulative wavelength dispersion generated in the WDM signal light that has passed through the first inter-repeater segment $4_1$ has a negative value.

The WDM signal light passing through the first inter-repeater segment $4_1$ is amplified to a required level by the optical amplifier $3_1$ and then sent to the second inter-repeater segment $4_2$. In the system like the one shown in FIG. 1 where cumulative wavelength dispersion is compensated for within every tenth inter-repeater segment, the WDM signal light is propagated successively over the second to ninth inter-repeater segments $4_2$ to $4_9$ and the optical amplifiers $3_2$ to $3_9$. Consequently, negative cumulative wavelength dispersion increases. The WDM signal light passing through the ninth inter-repeater segment $4_9$ and optical amplifier $3_9$ is sent to the tenth inter-repeater segment $4_{10}$, and propagated over the DCF 4c having positive wavelength dispersion. Consequently, cumulative wavelength dispersion generated in the second to ninth inter-repeater segments $4_2$ to $4_9$ is compensated for and converged to nearly zero. Thereafter, the same operation as the foregoing one is repeated for every ten inter-repeater segments. The WDM signal light is thus transmitted to the optical receiver station 2 via the repeaters.

The WDM signal light having reached the optical receiver station 2 is amplified to a required level by the preamplifier 2A, demultiplexed into a plurality of optical signals corresponding to different wavelengths thereof by the demultiplexer 2B, and then received and treated by the corresponding optical receivers 2C.

As mentioned above, according to the first embodiment, for a hybrid transmission line composed of the 1.3 μm zero-dispersion SMF 4a and RDF 4b, the requirements for setting the RDF ratio and others are optimized. Thereby, not only wavelength dispersion and wavelength dispersion-slope can be compensated for but also an influence due to a nonlinear effect or a transmission loss can be coped with to improve a transmission characteristic. Consequently, it becomes possible to realize a WDM optical transmission system having an excellent transmission characteristic.

Next, a second embodiment of the present invention will be described below.

Figure 19A:
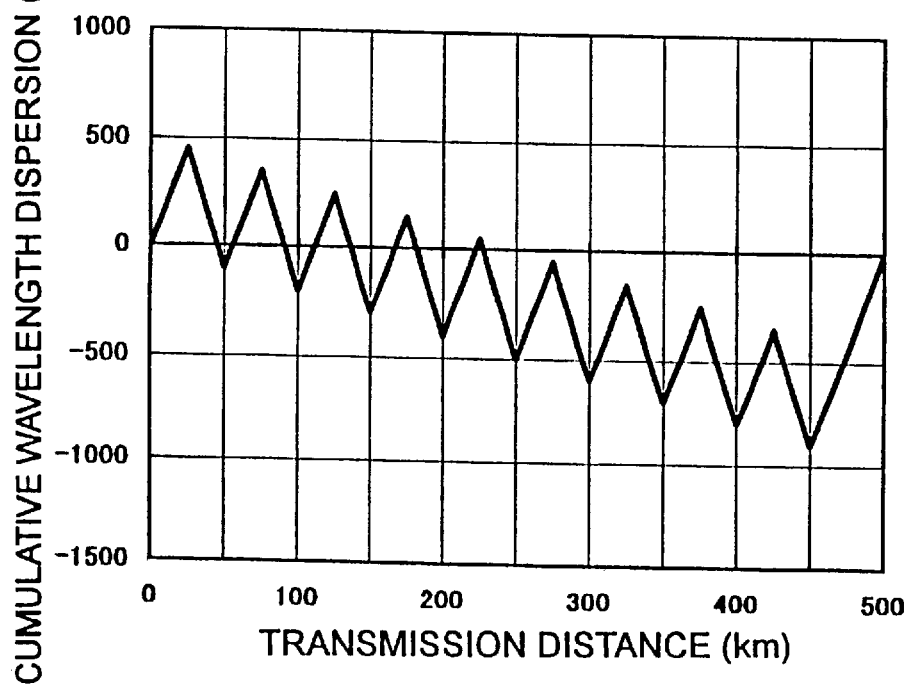
FIG. 19A and FIG. 19B show a wavelength dispersion map with a compensation interval of cumulative wavelength dispersion set to ten spans in the conventional WDM optical transmission system using a hybrid transmission line.
Figure 19B:
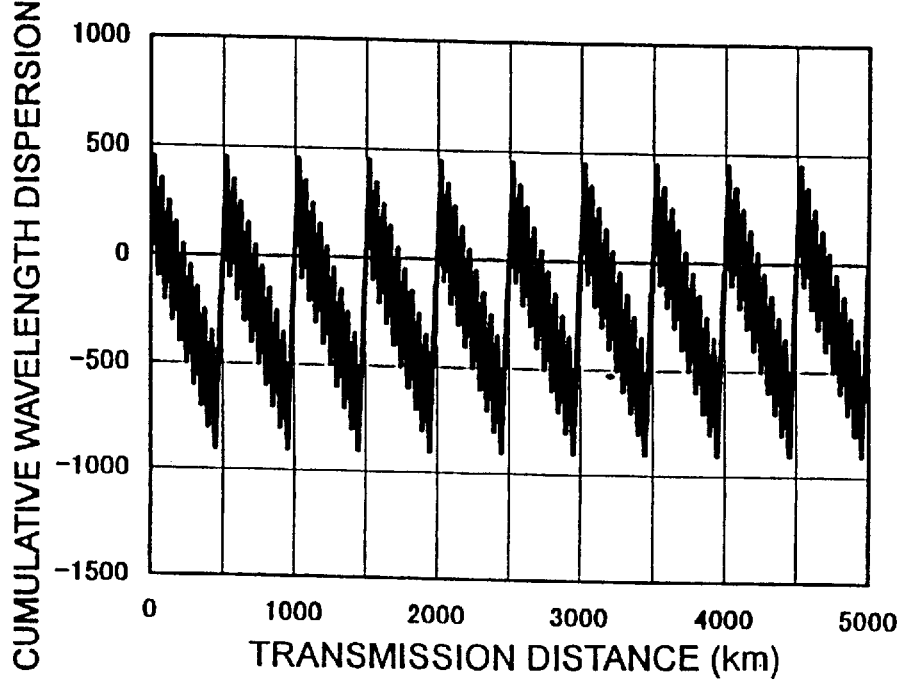

In the aforesaid first embodiment, cumulative wavelength dispersion generated in each hybrid transmission line is compensated for at required compensation intervals such as ten spans, and thus converged to nearly zero. However, according to this method of compensating for cumulative wavelength dispersion, similarly to the conventional method described in conjunction with FIG. 19, a state in which cumulative wavelength dispersion becomes positive is repeated periodically. When cumulative wavelength dispersion becomes positive, the peak value of optical power increases due to effect of optical pulse compression, to thereby become susceptible to a nonlinear effect. In the second embodiment, by taking a countermeasure in order to always keep cumulative wavelength dispersion negative, the nonlinear effect is prevented from being generated to thereby improve a transmission characteristic.

FIG. 11 is a block diagram showing a basic configuration of a WDM optical transmission system in accordance with the second embodiment. The same reference numerals are assigned to components identical to those of the first embodiment.

In FIG. 11, the present WDM optical transmission system comprises, in addition to the same components as those of the first embodiment, wavelength dispersion compensators 1D and 2D. The wavelength dispersion compensator 1D provided in the optical transmitter station 1 serves as a wavelength dispersion applying device. The wavelength dispersion compensator 2D provided in the optical receiver station 2 serves as a wavelength dispersion compensating device. The other components are identical to those of the first embodiment, and the description of the components will therefore be omitted.

The wavelength dispersion compensator 1D has preset negative wavelength dispersion, and is interposed between, for example, the multiplexer 1B and post-amplifier 1C. The absolute value of the negative wavelength dispersion of the wavelength dispersion compensator 1D is preferably equal to or larger than the absolute value of the positive wavelength dispersion generated in the 1.3 μm zero-dispersion SMF 4a used as the first half of hybrid transmission line. Specifically, the wavelength dispersion generated in the wavelength dispersion compensator 1D may be set to −400 ps/nm or less.

The wavelength dispersion compensator 2D has positive wavelength dispersion so as to compensate for negative wavelength dispersion applied by the wavelength dispersion compensator 1D, and is installed, for example, in a pre-stage of the pre-amplifier 2A. The wavelength dispersion compensator 2D may be omitted when it is unnecessary to compensate for negative wavelength dispersion applied by the wavelength dispersion compensator 1D during reception processing of WDM signal light.

Figure 12A:
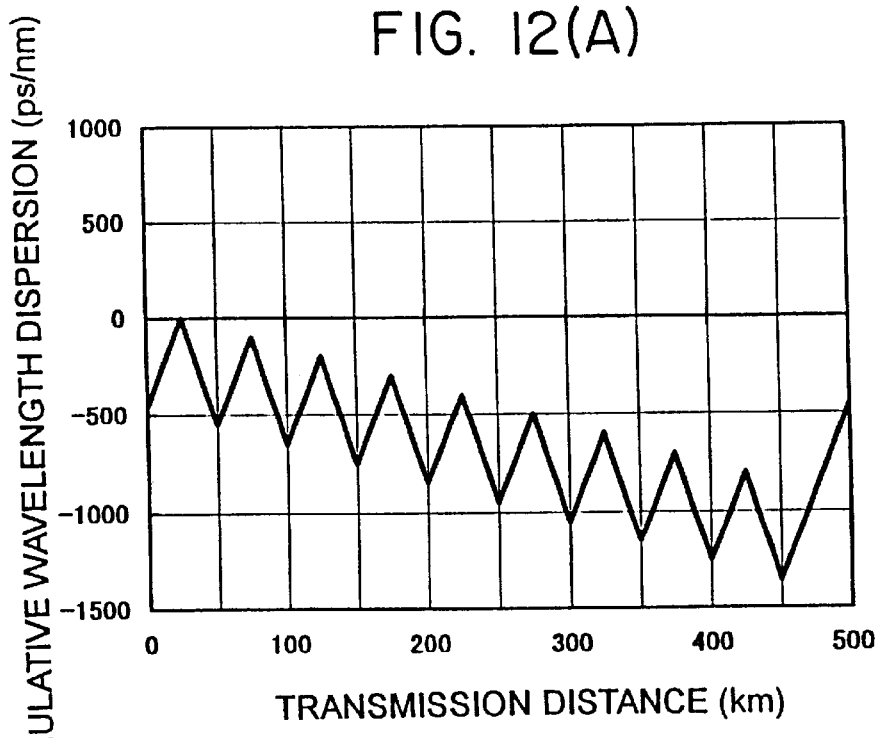
FIG. 12A and FIG. 12B show a wavelength dispersion map in accordance with the second embodiment.

In the WDM optical transmission system having the foregoing configuration, as shown in a map of wavelength dispersion of FIG. 12A, WDM signal light is applied with negative wavelength dispersion of −450 ps/nm or the like by the wavelength dispersion compensator 1D. The WDM signal light is sent to the first inter-repeater segment $4_1$ from the optical transmitter station 1.

Within the first inter-repeater segment $4_1$, when the WDM signal light is propagated over the 1.3 μm zero-dispersion SMF 4a, wavelength dispersion is increased. However, before becoming a positive value, the wavelength dispersion begins to decrease, since the 1.3 μm zero-dispersion SMF 4a is relayed to the RDF 4B in the transmission line. Consequently, the rate of wavelength dispersion of WDM signal light remains negative.

Figure 12B:
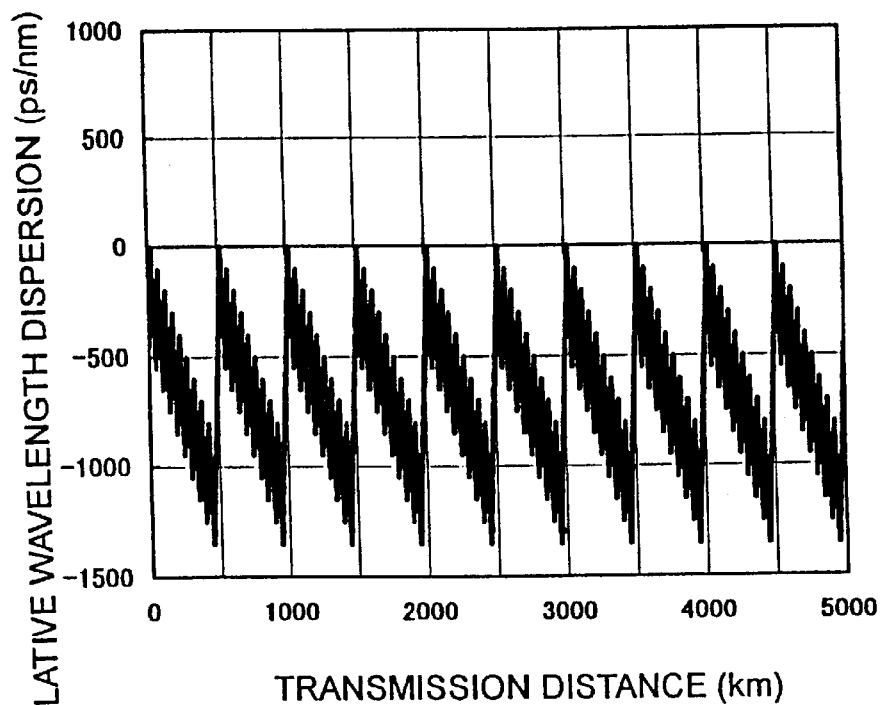

Furthermore, WDM signal light is propagated successively over the second to ninth inter-repeater segments, leading to the accumulation of negative wavelength dispersion. When the WDM signal light reaches the tenth inter-repeater segment, the DCF 4c having positive wavelength dispersion compensates for cumulative wavelength dispersion, and as a result that the value of wavelength dispersion becomes the same (−450 ps/nm) as that of WDM signal light sent from the optical transmitter station 1. Thereafter, the same operation is repeated for every ten inter-repeater segments. The WDM signal light is thus transmitted to the optical receiver station 2 via the repeaters. FIG. 12B shows a map of wavelength dispersion generated for when a transmission distance is made to be 5000 km.

WDM signal light having reached the optical receiver station 2 is received to be treated after negative wavelength dispersion thereof which was applied at the time of transmission has been compensated for by the wavelength dispersion compensator 2D.

As mentioned above, according to the second embodiment, the optical transmitter station 1 comprises the wavelength dispersion compensator 1D having negative wavelength dispersion whose absolute value is larger than that of positive wavelength dispersion generated in the 1.3 μm zero-dispersion SMF 4a of hybrid transmission line. Therefore, while WDM signal light is transmitted from the optical transmitter station 1 to the optical receiver station 2 via the repeaters, the wavelength dispersion of the WDM signal light remains negative always. Thus, a transmission line that more hardly generates a nonlinear effect can be realized and a transmission characteristic can be improved further. Moreover, by providing the wavelength dispersion compensator 2D, since wavelength dispersion of WDM signal light is compensated for more reliably, a more excellent transmission characteristic can be achieved.

According to the second embodiment, the wavelength dispersion compensator 1D is provided in the optical transmitter station 1 so that wavelength dispersion of WDM signal light will remain negative. However, wavelength dispersion of WDM signal light is not needed to remain negative always. By decreasing the number of times in which wavelength dispersion becomes positive, the probability that a nonlinear effect is generated can be lowered and a transmission characteristic can be improved.

To be more specific, instead of providing the wavelength dispersion compensator 1D, the magnitude of compensation of cumulative wavelength dispersion in the DCF 4c is decreased, to minimize the number of times in which wavelength dispersion of WDM signal light becomes positive. Namely, according to the first embodiment, compensation for cumulative wavelength dispersion is carried out in each DCF 4c so that the rate of cumulative wavelength dispersion will be nearly zero. Instead of this setting, the magnitude of compensation of cumulative wavelength dispersion is set to be a bit insufficient. Preferably, the cumulative wavelength dispersion compensation in the DCF 4c is set to be 90% or more and 95% or less.

According to this setting, as shown in FIGS. 13A and 13B, as a transmission distance gets longer, the cumulative wavelength dispersion becomes negative. Consequently, compared with the first embodiment, since a nonlinear effect is hardly generated, a transmission characteristic can be improved.

Next, a third embodiment of the present invention will be described below.

According to a WDM optical transmission system in accordance with the third embodiment, residual wavelength dispersion-slope that could not be compensated for by the optical fiber transmission line 4 in the aforesaid embodiments is compensated for to thereby further improve a transmission characteristic.

Figure 14:
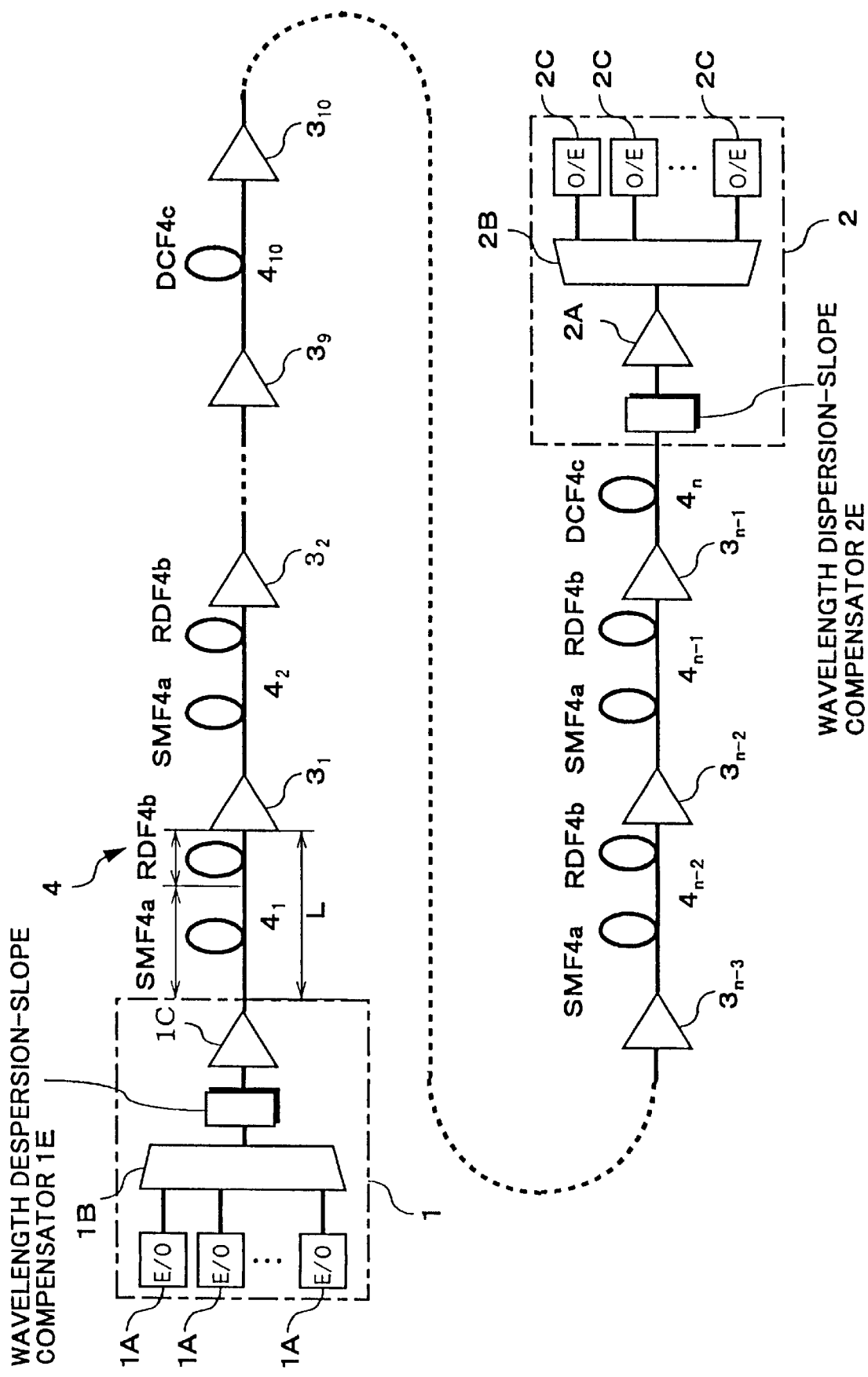
FIG. 14 is a block diagram showing a configuration of a third embodiment of the present invention.

FIG. 14 is a block diagram showing a schematic configuration of a WDM optical transmission system of the third embodiment.

Referring to FIG. 14, the WDM optical transmission system has, in addition to the same components as those of, for example, the first embodiment, residual wavelength dispersion-slope compensators 1E and 2E. The residual wavelength dispersion-slope compensators 1E and 2E serving as residual wavelength dispersion-slope compensation units are provided in the optical transmitter station 1 and optical receiver station 2 respectively. The other components are identical to those of the first embodiment.

Each of the residual wavelength dispersion-slope compensators 1E and 2E has a preset required wavelength dispersion-slope so as to correspond to residual wavelength dispersion-slope that could not be compensated for by the optical fiber transmission line 4. The residual wavelength dispersion-slope compensator 1E on the transmission side applies in advance wavelength dispersion-slope to WDM signal light to be sent to the optical fiber transmission line 4, to thereby alleviate residual wavelength dispersion-slope generated in the optical fiber transmission line 4. Moreover, the residual wavelength dispersion-slope compensator 2E on the reception side compensates finally for residual wavelength dispersion-slope remaining in WDM signal light having been propagated over the optical fiber transmission line 4.

According to the third embodiment, since wavelength dispersion-slope generated in WDM signal light can be compensated for reliably, a WDM optical transmission system with a more excellent transmission characteristic can be realized.

Figure 15:
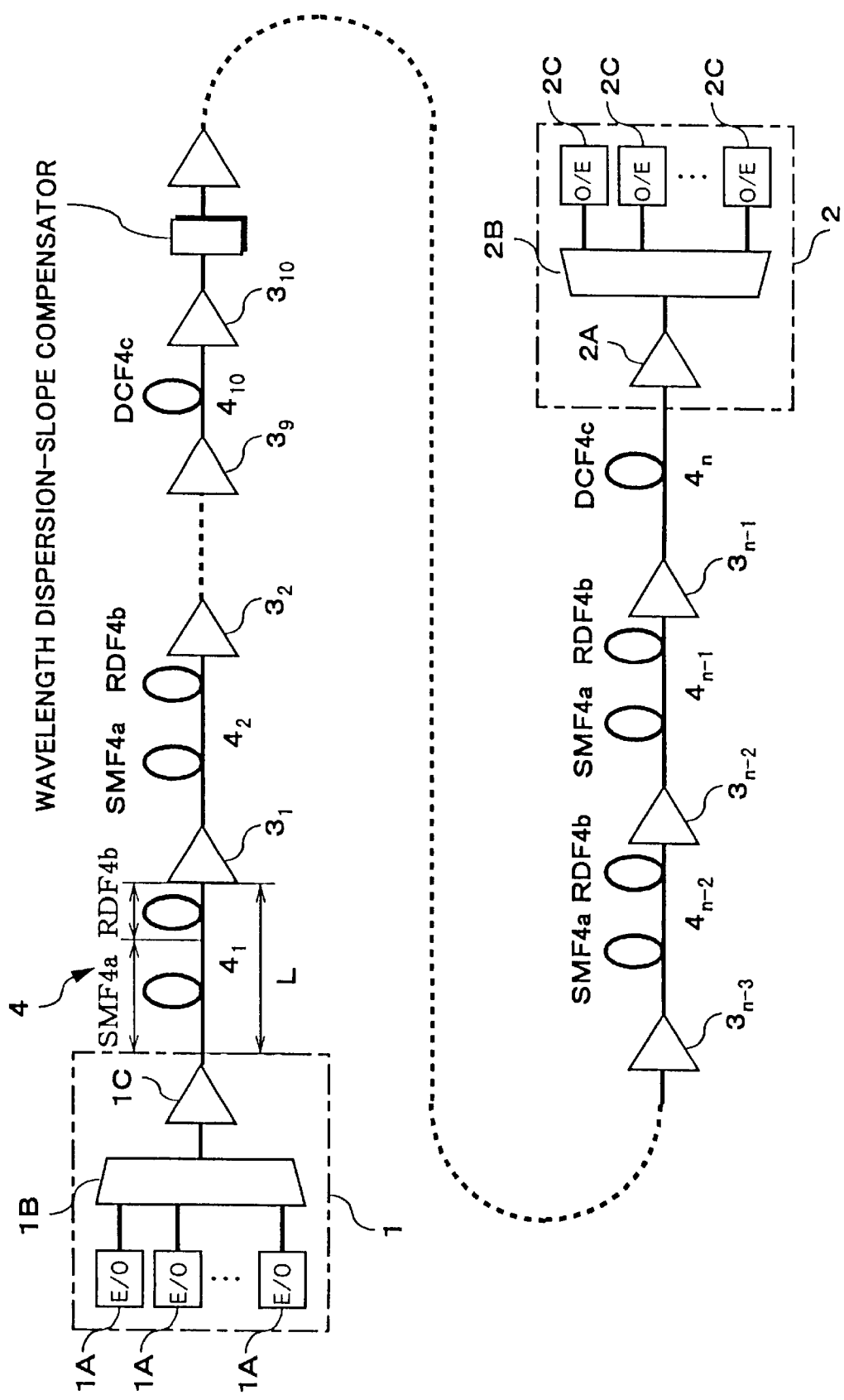
FIG. 15 is a block diagram showing another configuration relevant to the third embodiment.
Figure 16:
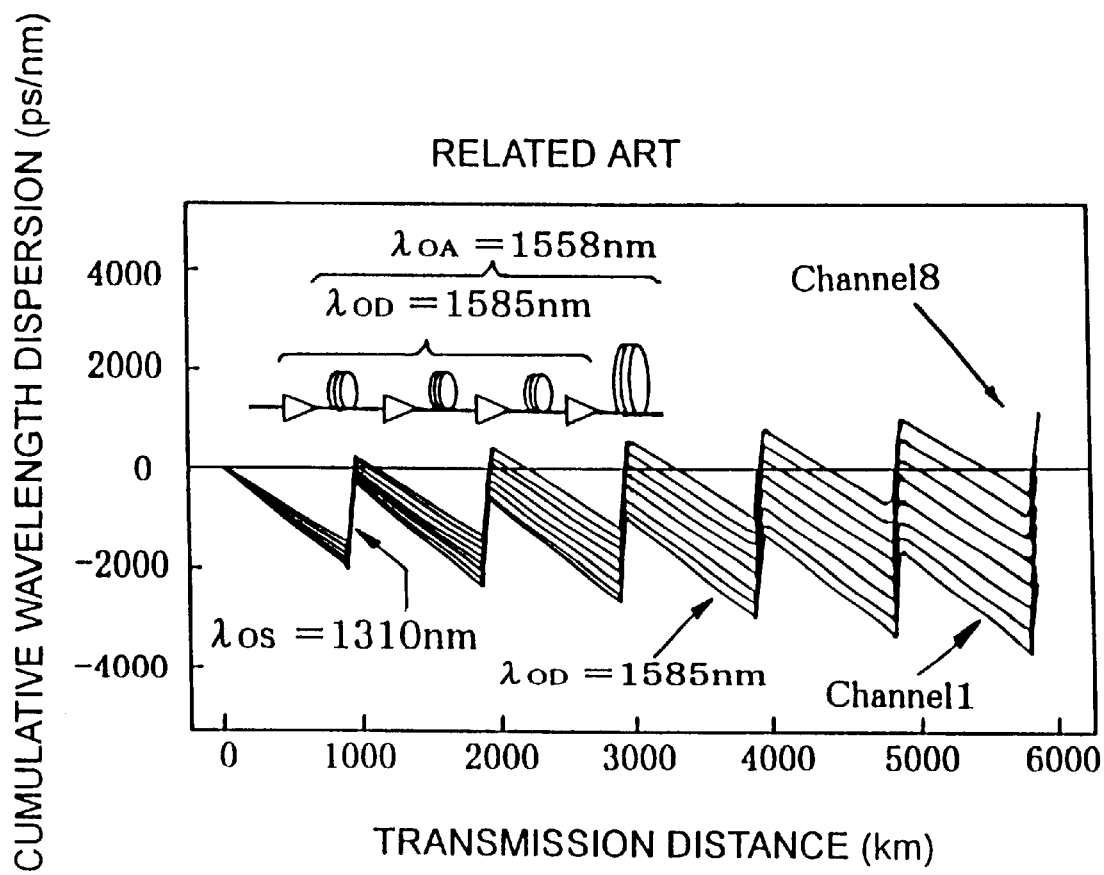
FIG. 16 shows an example of conventional WDM optical transmission systems.
Figure 17:
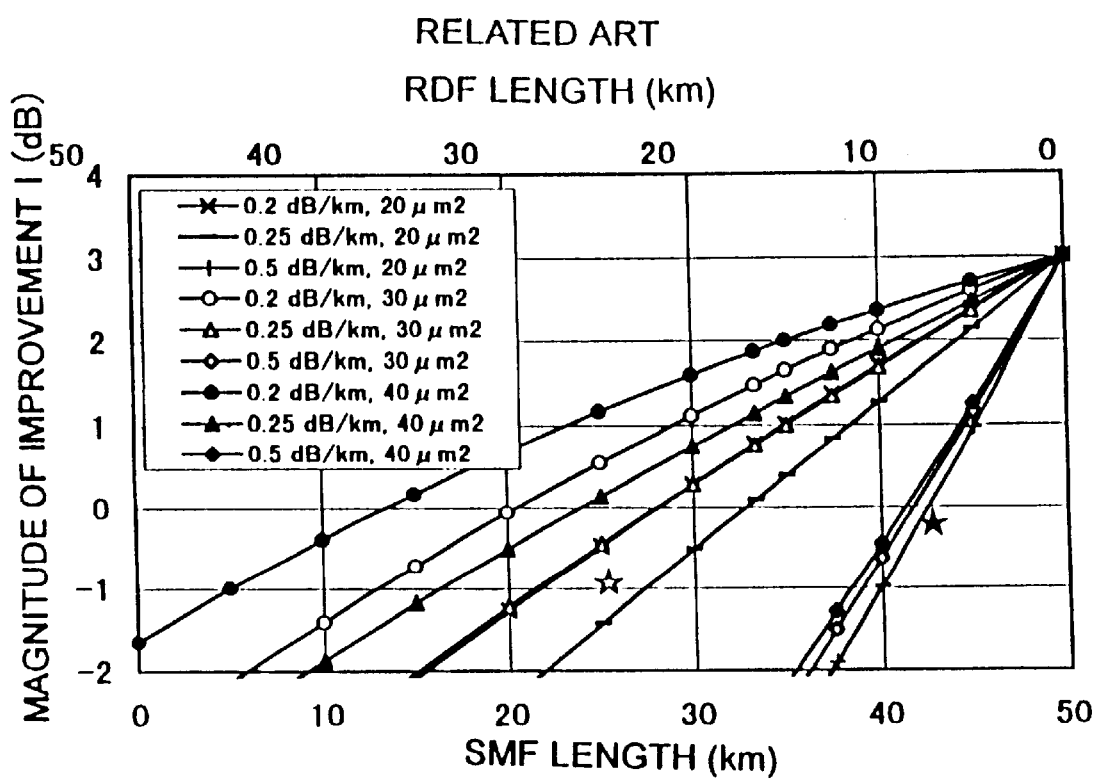
FIG. 17 shows the results of calculation for the magnitude of improvement in a transmission characteristic in relation to a conventional WDM optical transmission system using a hybrid transmission line.
Figure 18A:
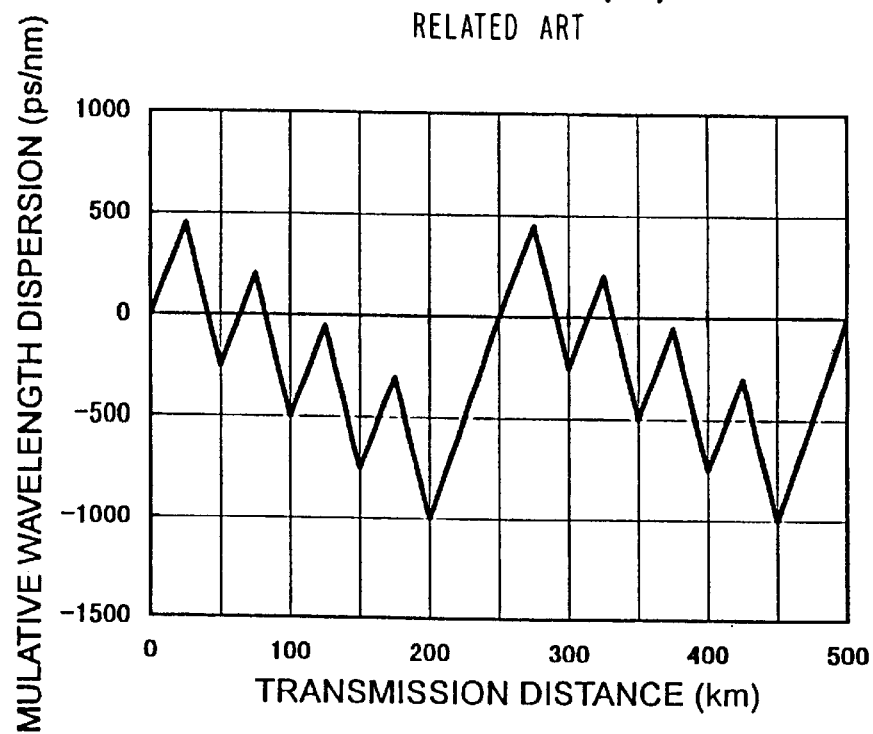
FIG. 18A and FIG. 18B show a wavelength dispersion map with a compensation interval of cumulative wavelength dispersion set to five spans in the conventional WDM optical transmission system using a hybrid transmission line.
Figure 18B:
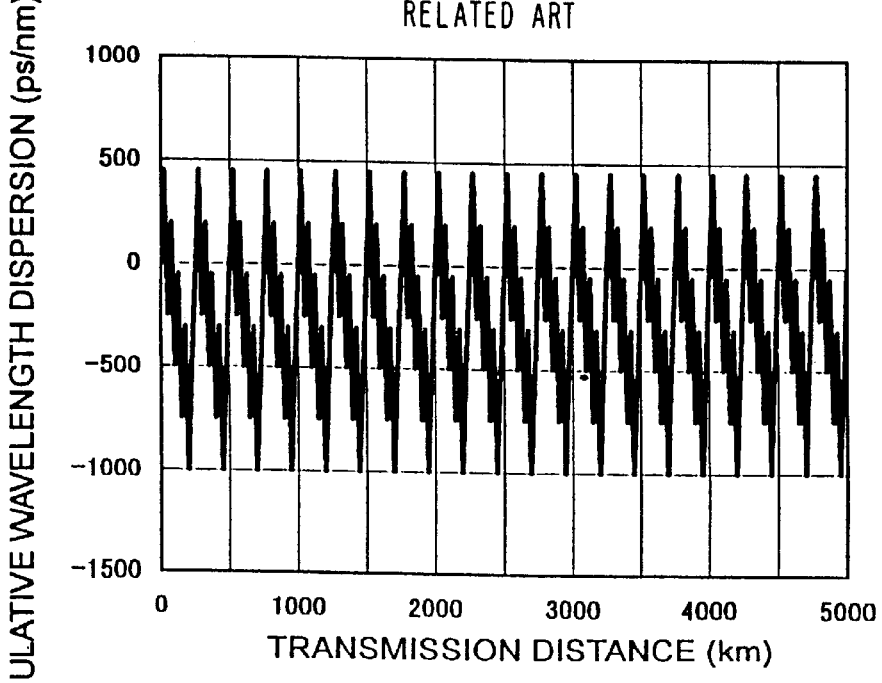

In the third embodiment, the residual wavelength dispersion-slope compensators are installed in both the optical transmitter station and optical receiver station. The present invention is not limited to this mode. The residual wavelength dispersion-slope compensator may be installed in either the optical transmitter station or the optical receiver station. Otherwise, as shown in FIG. 15, the residual wavelength dispersion-slope compensator may be installed in the middle of the optical fiber transmission line 4.

Moreover, the WDM optical transmission system is designed to compensate for residual wavelength dispersion-slope. Alternatively, a residual wavelength dispersion compensator serving as a residual wavelength dispersion compensation unit may be installed in the optical transmitter station or optical receiver station or in the middle of the optical fiber transmission line, so that residual wavelength dispersion that could not be compensated for by the optical fiber transmission line 4 may be compensated for.

Furthermore, in the aforesaid first to third embodiments, the system comprises the optical transmission line composed of a plurality (n) inter-repeater segments. The present invention is not limited to this mode. For example, even in a case that a hybrid transmission line satisfying the requirement of the present invention may be adapted to an optical transmission line composed of one transmission segment, a transmission characteristic can be improved.

What we claimed are:

1. A wavelength division multiplexing optical transmission system, comprising:

an optical transmission line which has a first transmission segment formed by linking together a first optical fiber having positive wavelength dispersion relative to a signal light wavelength and a relatively large nonlinear effective area, and a second optical fiber having negative wavelength dispersion relative to a signal light wavelength and a relatively small nonlinear effective area; and an optical amplification unit for amplifying wavelength division multiplexed signal light being propagated over said optical transmission line, wherein said wavelength division multiplexed signal light input to said optical transmission line is propagated successively over said first optical fiber and second optical fiber of said first transmission segment, and then sent to said optical amplification unit; and wherein said optical transmission line is such that a ratio of the length of said second optical fiber to the length of said first transmission segment is 20% or more and 40% or less.

2. A wavelength division multiplexing optical transmission system according to claim 1, wherein said optical transmission line has a plurality of first transmission segments, and said optical amplification unit has a plurality of optical amplifiers installed between said respective first transmission segments.

3. A wavelength division multiplexing optical transmission system according to claim 2, wherein said optical transmission line is such that the sum of the value of cumulative wavelength dispersion generated in said first optical fiber and the value of cumulative wavelength dispersion generated in said second optical fiber is negative.

4. A wavelength division multiplexing optical transmission system according to claim 3, wherein said optical transmission line has a second transmission segment formed with a third optical fiber having positive wavelength dispersion, and said second transmission segment is disposed at each of intervals of a preset number of first transmission segments to compensate for negative cumulative wavelength dispersion generated in said first transmission segments.

5. A wavelength division multiplexing optical transmission system according to claim 4, where in said third optical fiber is of the same type as said first optical fiber.

6. A wavelength division multiplexing optical transmission system according to claim 1, wherein said optical transmission line is such that said first optical fiber is a 1.3 $\mu$m zero-dispersion fiber and said second optical fiber is a dispersion compensation fiber.

7. A wavelength division multiplexing optical transmission system according to claim 6, wherein said optical transmission line is such that the value of wavelength dispersion-slope generated in said second optical fiber is −0.1 6 ps/nm²/km or more and −0.07 ps/nm²/km or less.

8. A wavelength division multiplexing optical transmission system according to claim 6, wherein
said optical transmission line is such that a compensation ratio of wavelength dispersion-slope of said second optical fiber to wavelength dispersion-slope of said first optical fiber is 28% or more and 165% or less.

9. A wavelength division multiplexing optical transmission system according to claim 1, further comprising
a residual wavelength dispersion compensation unit for compensating for wavelength dispersion remaining in wavelength division multiplexed signal light having been propagated over said optical transmission line.

10. A wavelength division multiplexing optical transmission system according to claim 1, further comprising
a residual wavelength dispersion-slope compensation unit for compensating for wavelength dispersion-slope remaining in wavelength division multiplexed signal light having been propagated over said optical transmission line.

11. A wavelength division multiplexing optical transmission system, comprising:
an optical transmission line which has a first transmission segment formed by linking together a first optical fiber having positive wavelength dispersion relative to a signal light wavelength and a relatively large nonlinear effective area, and a second optical fiber having negative wavelength dispersion relative to a signal light wavelength and a relatively small nonlinear effective area; and
an optical amplification unit for amplifying wavelength division multiplexed signal light being propagated over said optical transmission line,
wherein said wavelength division multiplexed signal light input to said optical transmission line is propagated successively over said first optical fiber and second optical fiber of said first transmission segment, and then sent to said optical amplification unit,
said wavelength division multiplexing optical transmission system further comprising:
a wavelength dispersion applying means for applying a preset negative wavelength dispersion to said wavelength division multiplexed signal light input to said optical transmission line.

12. A wavelength division multiplexing optical transmission system according to claim 11,
wherein said wavelength dispersion applying means applies negative wavelength dispersion whose absolute value is equal to or larger than the absolute value of the cumulative wavelength dispersion generated in said first optical fiber.

13. A wavelength division multiplexing optical transmission system according to claim 11, further comprising
a wavelength dispersion compensating means for compensating for negative wavelength dispersion applied to said wavelength division multiplexed signal light output from said optical transmission line by said wavelength dispersion applying means.

14. A wavelength division multiplexing optical transmission system according to claim 11,
wherein said optical transmission line has a plurality of first transmission segments, and said optical amplification unit has a plurality of optical amplifiers installed between said respective first transmission segments.

15. A wavelength division multiplexing optical transmission system according to claim 14,
wherein said optical transmission line is such that the sum of the value of cumulative wavelength dispersion generated in said first optical fiber and the value of cumulative wavelength dispersion generated in said second optical fiber is negative.

16. A wavelength division multiplexing optical transmission system according to claim 15,
wherein said optical transmission line has a second transmission segment formed with a third optical fiber positive wavelength dispersion, and said second transmission segment is disposed at each of intervals of a preset number of first transmission segments to compensate for negative cumulative wavelength dispersion generated in said first transmission segments.

17. A wavelength division multiplexing optical transmission system, comprising:
an optical transmission line having a plurality of first transmission segments, each of which is formed by linking together a first optical fiber having positive wavelength dispersion relative to a signal light wavelength and a relatively larger nonlinear effective area, and a second optical fiber having negative wavelength dispersion relative to a signal light wavelength and a relatively small nonlinear effective area, and a second transmission segment formed with a third optical fiber having wavelength dispersion capable of compensating negative cumulative wavelength dispersion generated in said preset number of first transmission segments; and
an optical amplification unit for amplifying wavelength division multiplexed signal light being propagated over said optical transmission line,
wherein said wavelength division multiplexed signal light input to said optical transmission line is propagated successively over said first optical fiber and second optical fiber of each of said first transmission segments, and then sent to said optical amplification unit; and said wavelength division multiplexed signal light is propagated over said preset number of first transmission segments, and then sent to said second transmission segment; and
wherein said optical transmission line is set so that the magnitude of compensation in said second transmission segment will be insufficient for negative cumulative wavelength dispersion generated in said preset number of first transmission segments.

18. A wavelength division multiplexing optical transmission system according to claim 17,
wherein said optical transmission line is such that a compensation rate of cumulative wavelength dispersion in said second transmission segment is 90% or more and 95% or less.

19. A wavelength division multiplexing optical transmission system according to claim 17,
wherein said third optical fiber is of the same type of said first optical fiber.

20. A wavelength division multiplexing optical transmission system according to claim 17, further comprising
a wavelength dispersion applying means for applying a preset negative wavelength dispersion to said wavelength division multiplexed signal light input to said optical transmission line.

21. A wavelength division multiplexing optical transmission system according to claim 11,
wherein said optical transmission line is such that the ratio of the length of said second optical fiber to the length of each first transmission segment is 20% or more and 40% or less.

22. A wavelength division multiplexing optical transmission system according to claim 11,
wherein said optical transmission line is such that said first optical fiber is a 1.3 µm zero-dispersion fiber and said second optical fiber is a dispersion compensation fiber.

23. An optical transmission line for optical communication, comprising:
a first optical fiber having a positive wavelength dispersion value and positive wavelength dispersion-slope relative to a transmitted signal light; and
a second optical fiber having a negative wavelength dispersion value and negative wavelength dispersion-slope relative to a transmitted signal light, said first and second optical fiber, linked together, forms a transmission segment of said optical transmission line,
wherein a ratio of the length of said second optical fiber to the entirety of the length of said transmission segment is from 20 to 40%, and wherein said transmitted signal light is propagated over in order of said first optical fiber and second optical fiber.

24. An apparatus comprising:
an optical transmission line having an inter-repeater segment formed by linking together a first optical fiber having positive wavelength dispersion relative to an optical signal light and a second optical fiber having negative wavelength dispersion relative to the optical signal light,
wherein the ratio of the length of said second optical fiber to the length of said inter-repeater segment is from 20 to 40%.

25. An apparatus comprising:
an optical transmission line having an inter-repeater segment formed by linking together a first optical fiber having a positive wavelength dispersion value and positive wavelength dispersion-slope relative to an optical signal light and a second optical fiber having a negative wavelength dispersion value and negative wavelength dispersion-slope relative to the optical signal light,
wherein the ratio of the length of said second optical fiber to the length of said inter-repeater segment is from 20 to 40%.

* * * * *